US006064170A

United States Patent [19]

Spurr et al.

[11] Patent Number: 6,064,170

[45] Date of Patent: May 16, 2000

[54] METHOD OF CONTROLLING A PRINTHEAD MOVEMENT BASED ON A SCREW PITCH TO MINIMIZE SWATH-TO-SWATH ERROR IN AN IMAGE PROCESSING APPARATUS

[75] Inventors: Robert W. Spurr, Rochester; Roger S. Kerr, Brockport; Kurt M. Sanger, Rochester, all of N.Y.

[73] Assignee: Eastman Kodak Company, Rochester, N.Y.

[21] Appl. No.: 09/144,390

[22] Filed: Aug. 31, 1998

[51] Int. Cl.$^{7}$ .................................................. H02P 9/00

[52] U.S. Cl. .......................... 318/685; 318/696; 318/632

[58] Field of Search ................................ 318/632, 696, 318/685; 347/215–219; 408/1 R, 3, 22

[56] References Cited

U.S. PATENT DOCUMENTS

| | | | |
|---|---|---|---|
| 3,654,446 | 4/1972 | Gordon et al. | 702/94 |
| 4,115,726 | 9/1978 | Patterson et al. . | |
| 4,285,012 | 8/1981 | Ohara et al. . | |
| 4,302,712 | 11/1981 | Pritchard . | |
| 4,584,512 | 4/1986 | Pritchard . | |
| 4,629,916 | 12/1986 | Oudet . | |
| 4,642,494 | 2/1987 | Lundin et al. . | |
| 4,652,806 | 3/1987 | Aiello . | |
| 4,703,243 | 10/1987 | Ettelman et al. . | |
| 4,710,691 | 12/1987 | Bergstrom et al. . | |
| 4,739,201 | 4/1988 | Brigham et al. . | |
| 4,757,327 | 7/1988 | Henzi . | |
| 4,792,739 | 12/1988 | Nakamura et al. | 318/661 |
| 4,975,714 | 12/1990 | Rose . | |
| 5,021,941 | 6/1991 | Ford et al. | 364/176 |
| 5,225,757 | 7/1993 | Burke . | |
| 5,264,949 | 11/1993 | Stemmle . | |
| 5,268,708 | 12/1993 | Harshbarger et al. . | |
| 5,278,578 | 1/1994 | Baek et al. . | |
| 5,291,214 | 3/1994 | Baek et al. . | |
| 5,329,297 | 7/1994 | Sanger et al. . | |
| 5,374,883 | 12/1994 | Morser | 318/605 |
| 5,410,200 | 4/1995 | Sakamoto et al. . | |
| 5,410,338 | 4/1995 | Jadrich et al. . | |
| 5,428,371 | 6/1995 | Fox et al. . | |
| 5,834,918 | 11/1998 | Taylor et al. | 318/601 |

OTHER PUBLICATIONS

Journal of the Optical Society of America, Mar. 1967, vol. 57, No.3, pp. 401–406, “Spatial Modulation Transfer in the Human Eye”.

*Primary Examiner*—Brian Sircus
*Attorney, Agent, or Firm*—David A. Novais; Nelson Adrian Blish

[57] ABSTRACT

An image processing apparatus (10), typically for sheet thermal print media. The image processing apparatus (10) typically comprises a vacuum imaging drum (300) for holding thermal print media (32) and dye donor sheet material (36) in registration on the vacuum imaging drum (300). A printhead (500), driven by a lead screw (250), moves along a line parallel to a longitudinal axis (301) of the vacuum imaging drum (300) as the vacuum imaging drum (300) rotates. The printhead (500) receives information signals and produces radiation which is directed to the dye donor material (36) which causes color to transfer from the dye donor material (36) to the thermal print media (32). A stepper motor (162) that turns the lead screw (250) can run in a microstepping mode. To determine an optimal lead screw (250) pitch, a method of this invention utilizes the characteristic sinusoidal positional error (154) behavior of the stepper motor (162) that is at 4 times the frequency of the composite microstepping current waveform, and calculates the ideal value (in/rev or mm/rev) based on image resolution, number of full steps per revolution of the stepper motor (162), and the number of pixels per motor step. An integral, power of 2 multiple of the ideal value, based on suitability of stepper motor (162) speed, is then used to derive the lead screw (250) pitch. Based on the lead screw (250) pitch selected, the phase angle relationship of positional error (154), swath-to-swath, varies within a small set of discrete values, based on the number of channels used in the writing swath (450).

5 Claims, 13 Drawing Sheets

FIG. 4a1

METHOD OF CONTROLLING A PRINTHEAD MOVEMENT BASED ON A SCREW PITCH TO MINIMIZE SWATH-TO-SWATH ERROR IN AN IMAGE PROCESSING APPARATUS

CROSS REFERENCE TO RELATED APPLICATIONS

The present application is related to co-pending U.S. patent application Ser. No. (to be assigned) (Attorney Docket No. 77131) by Roger S. Kerr and Robert W. Spurr, entitled LINEAR TRANSLATION SYSTEM DITHERING FOR IMPROVED IMAGE QUALITY OF AN INTENDED IMAGE; U.S. patent application Ser. No. (to be assigned) (Attorney Docket No. 78184) by Robert W. Spurr, entitled PROGRAMMABLE GEARING CONTROL OF A LEAD-SCREW FOR A PRINTHEAD HAVING A VARIABLE NUMBER OF CHANNELS and U.S. patent application Ser. No. (to be assigned) (Attorney Docket No. 78003) by Robert W. Spurr and Seung Ho Baek, entitled METHOD FOR COMPENSATING FOR POSITIONAL ERROR INHERENT TO STEPPER MOTORS RUNNING IN MICROSTEPPING MODE.

FIELD OF THE INVENTION

The present invention relates to imaging systems which use a stepper motor that operates in a microstepping mode. Specifically, the present invention relates to an image processing apparatus that uses a vacuum imaging drum and a printhead that moves along a surface of the drum parallel to the drum axis, and writes pixels in a helical swath to create an image.

BACKGROUND OF THE INVENTION

Pre-press color proofing is a procedure that is used by the printing industry for creating representative images of printed material, without the high cost and time that is required to actually produce printing plates and set up a high-speed, high-volume, printing press to produce a single example of an intended image. These intended images may require several corrections and may need to be reproduced several times to satisfy the requirements of customers, resulting in a large loss of profits. By utilizing pre-press color proofing time and money can be saved.

One such commercially available image processing apparatus, which is depicted in commonly assigned U.S. Pat. No. 5,268,708 is an image processing apparatus having half-tone color proofing capabilities. This image processing apparatus is arranged to form an intended image on a sheet of thermal print media by transferring dye from a sheet of dye donor material to the thermal print media by applying a sufficient amount of thermal energy to the dye donor material to form an intended image. This image processing apparatus is comprised generally of a material supply assembly or carousel, a lathe bed scanning subsystem (which includes a lathe bed scanning frame, a translation drive, a translation stage member, a printhead, and a vacuum imaging drum), and thermal print media and dye donor material exit transports.

The operation of the above image processing apparatus comprises metering a length of the thermal print media (in roll form) from the material assembly or carousel. The thermal print media is then measured and cut into sheet form of the required length, transported to the vacuum imaging drum, registered, wrapped around and secured onto the vacuum imaging drum. Next a length of dye donor material (in roll form) is also metered out of the material supply assembly or carousel, then measured and cut into sheet form of the required length. It is then transported to and wrapped around the vacuum imaging drum, such that it is superposed in the desired registration with respect to the thermal print media (which has already been secured to the vacuum imaging drum).

After the dye donor material is secured to the periphery of the vacuum imaging drum, the scanning subsystem or write engine provides the scanning function. This is accomplished by retaining the thermal print media and the dye donor material on the spinning vacuum imaging drum while it is rotated past the printhead that will expose the thermal print media. The translation drive then traverses the printhead and translation stage member axially along the vacuum imaging drum, in coordinated motion with the rotating vacuum imaging drum. These movements combine to produce the intended image on the thermal print media.

After the intended image has been written on the thermal print media, the dye donor material is then removed from the vacuum imaging drum. This is done without disturbing the thermal print media that is beneath it. The dye donor material is then transported out of the image processing apparatus by the dye donor material exit transport. Additional dye donor materials are sequentially superposed with the thermal print media on the vacuum imaging drum, then imaged onto the thermal print media as previously mentioned, until the intended image is completed. The completed image on the thermal print media is then unloaded from the vacuum imaging drum and transported to an external holding tray on the image processing apparatus by the receiver sheet material exit transport.

The material supply assembly comprises a carousel assembly mounted for rotation about its horizontal axis on bearings at the upper ends of vertical supports. The carousel comprises a vertical circular plate having in this case six (but not limited to six) material support spindles. These support spindles are arranged to carry one roll of thermal print media, and four rolls of dye donor material to provide the four primary colors used in the writing process to form the intended image, and one roll as a spare or for a specialty color dye donor material (if so desired). Each spindle has a feeder assembly to withdraw the thermal print media or dye donor material from the spindles to be cut into a sheet form. The carousel is rotated about its axis into the desired position, so that the thermal print media or dye donor material (in roll form) can be withdrawn, measured, and cut into sheet form of the required length, and then transported to the vacuum imaging drum.

The scanning subsystem or write engine of the lathe bed scanning type comprises a mechanism that provides the mechanical actuators, for the vacuum imaging drum positioning and motion control to facilitate placement, loading onto, and removal of the thermal print media and the dye donor material from the vacuum imaging drum. The scanning subsystem or write engine provides the scanning function by retaining the thermal print media and dye donor material on the rotating vacuum imaging drum, which generates a once per revolution timing signal to the data path electronics as a clock signal; while the translation drive traverses the translation stage member and printhead axially along the vacuum imaging drum in a coordinated motion with the vacuum imaging drum rotating past the printhead. This is done with positional accuracy maintained, to allow precise control of the placement of each pixel, in order to produce the intended image on the thermal print media.

The lathe bed scanning frame provides the structure to support the vacuum imaging drum and its rotational drive. The translation drive with a translation stage member and printhead are supported by two translation bearing rods that are substantially straight along their longitudinal axis and are positioned parallel to the vacuum imaging drum and lead screw. Consequently, they are parallel to each other therein forming a plane, along with the vacuum imaging drum and lead screw. The translation bearing rods are, in turn, supported by outside walls of the lathe bed scanning frame of the lathe bed scanning subsystem or write engine. The translation bearing rods are positioned and aligned therebetween, for permitting low friction movement of the translation stage member and the translation drive. The translation bearing rods are sufficiently rigid for this application, so as not to sag or distort between the mounting points at their ends. They are arranged to be as exactly parallel as is possible with the axis of the vacuum imaging drum. The front translation bearing rod is arranged to locate the axis of the printhead precisely on the axis of the vacuum imaging drum with the axis of the printhead located perpendicular, vertical, and horizontal to the axis of the vacuum imaging drum, The translation stage member front bearing is arranged to form an inverted "V" and provides only that constraint to the translation stage member. The translation stage member with the printhead mounted on the translation stage member, is held in place by only its own weight. The rear translation bearing rod locates the translation stage member with respect to rotation of the translation stage member about the axis of the front translation bearing rod. This is done so as to provide no over-constraint of the translation stage member which might cause it to bind, chatter, or otherwise impart undesirable vibration or jitters to the translation drive or printhead during the writing process causing unacceptable artifacts in the intended image. This is accomplished by the rear bearing which engages the rear translation bearing rod only on a diametrically opposite side of the translation bearing rod on a line perpendicular to a line connecting the centerlines of the front and rear translation bearing rods.

The translation drive is for permitting relative movement of the printhead by synchronizing the motion of the printhead and stage assembly such that the required movement is made smoothly and evenly throughout each rotation of the drum. A clock signal generated by a drum encoder provides the necessary reference signal accurately indicating the position of the drum. This coordinated motion results in the printhead tracing out a helical pattern around the periphery of the drum. The positional error of the printhead can be characterized and is shown to be periodic with a frequency that is 4 times the frequency of a composite current waveform that drives a stepper motor.

With the previously discussed color proofing system, the translation drive motion is obtained using a DC servo motor with a feedback encoder. The DC servo motor rotates a lead screw that is aligned generally in parallel with the axis of the vacuum imaging drum. The printhead is placed on the translation stage member in a "V" shaped groove, which is formed in the translation stage member, which is in precise positional relationship to the bearings for the front translation stage member supported by the front and rear translation bearing rods. The translation bearing rods are positioned parallel to the vacuum imaging drum, so that the translation stage member automatically adopts the preferred orientation with respect to the surface of the vacuum imaging drum.

The printhead is selectively locatable with respect to the translation stage member; thus it is positioned with respect to the vacuum imaging drum surface. By adjusting the distance between the printhead and the vacuum imaging drum surface, as well as the angular position of the printhead about its axis using adjustment screws, an accurate means of adjustment for the printhead is provided. Extension springs provide the load against these two adjustment means.

The translation stage member and printhead are attached to a rotatable lead screw (having a threaded shaft) by a drive nut and coupling. The coupling is arranged to accommodate misalignment of the drive nut and lead screw so that only rotational forces and forces parallel to the lead screw are imparted to the translation stage member by the lead screw and drive nut. The lead screw rests between two sides of the lathe bed scanning frame of the lathe bed scanning subsystem or write engine, where it is supported by deep groove radial bearings. At the drive end the lead screw continues through the deep groove radial bearing, through a pair of spring retainers, that are separated and loaded by a compression spring to provide axial loading, and to a DC servo drive motor and encoder. The DC servo drive motor induces rotation to the lead screw moving the translation stage member and printhead along the threaded shaft as the lead screw is rotated. The lateral directional movement of the printhead is controlled by switching the direction of rotation of the DC servo drive motor and thus the lead screw.

The printhead includes a plurality of laser diodes which are coupled to the printhead by fiber optic cables which can be individually modulated to supply energy to selected areas of the thermal print media in accordance with an information signal. The printhead of the image processing apparatus includes a plurality of optical fibers coupled to the laser diodes at one end and the other end to a fiber optic array within the printhead. The printhead is movable relative to the longitudinal axis of the vacuum imaging drum. The dye is transferred to the thermal print media as the radiation, transferred from the laser diodes by the optical fibers to the printhead and thus to the dye donor material is converted to thermal energy in the dye donor material.

The printhead writes its image as a swath comprising a plurality of laser diode signals, where this swath is written in a helical pattern in coordination with the rotation of the vacuum imaging drum. To minimize possible imaging anomalies due to frequencies of dot patterns and the characteristics of the image writing hardware, it is advantageous to be able to write the image with a variable number of lasers. U.S. Pat. No. 5,329,297, the subject matter of which is herein incorporated by reference, describes this problem in detail and discloses how this can be achieved with the existing system. Briefly, this is accomplished by disabling lasers on the outer periphery of the swath and changing the timing of printhead movement across the vacuum imaging drum to correspond to the changed swath width.

The vacuum imaging drum is cylindrical in shape and includes a hollowed-out interior portion. The vacuum imaging drum further includes a plurality of holes extending through its housing for permitting a vacuum to be applied from the interior of the vacuum imaging drum for supporting and maintaining the position of the thermal print media and dye donor material as the vacuum imaging drum rotates. The ends of the vacuum imaging drum are enclosed by cylindrical end plates. The cylindrical end plates are each provided with a centrally disposed spindle which extends outwardly through support bearings and are supported by the lathe bed scanning frame. The drive end spindle extends through the support bearing and is stepped down to receive a DC drive motor rotor which is held on by means of a nut. A DC motor stator is stationarily held by the lathe bed scanning frame member, encircling the armature to form a reversible, variable speed DC drive motor for the vacuum imaging drum. At the end of the spindle an encoder is mounted to provide the timing signals to the image processing apparatus. The opposite spindle is provided with a central vacuum opening, which is in alignment with a vacuum fitting with an external flange that is rigidly mounted to the lathe bed scanning frame. The vacuum fitting has an extension which extends within but is closely spaced from the vacuum spindle, thus forming a small clearance. With this configuration, a slight vacuum leak is provided between the outer diameter of the vacuum fitting and the inner diameter of the opening of the vacuum spindle. This assures that no contact exists between the vacuum fitting and the vacuum imaging drum which might impart uneven movement or jitters to the vacuum imaging drum during its rotation.

The opposite end of the vacuum fitting is connected to a high-volume vacuum blower which is capable of producing 50–60 inches of water (93.5–112.2 mm of mercury) at an air flow volume of 60–70 cfm (28.368–33.096 liters per second). This provides the vacuum to the vacuum imaging drum to support the various internal vacuum levels of the vacuum imaging drum required during the loading, scanning and unloading of the thermal print media and the dye donor materials to create the intended image. With no media loaded on the vacuum imaging drum the internal vacuum level of the vacuum imaging drum is approximately 10–15 inches of water (18.7–28.05 mm of mercury). With just the thermal print media loaded on the vacuum imaging drum the internal vacuum level of the vacuum imaging drum is approximately 20–25 inches of water (37.4–46.75 mm of mercury); this is the level required when a dye donor material is removed so that the thermal print media does not move, otherwise color to color registration will not be maintained. With both the thermal print media and dye donor material completely loaded on the vacuum imaging drum the internal vacuum level of the vacuum imaging drum is approximately 50–60 inches of water (93.5–112.2 mm of mercury) in this configuration.

The task of loading and unloading the dye donor materials onto and off from the vacuum imaging drum requires precise positioning of the thermal print media and the dye donor materials. The lead edge positioning of dye donor material must be accurately controlled during this process. Existing image processing apparatus designs, such as that disclosed in the above-mentioned commonly assigned U.S. patent, employs a multi-chambered vacuum imaging drum for such lead-edge control. One appropriately controlled chamber applies vacuum that holds the lead edge of the dye donor material. Another chamber, separately valved, controls vacuum that holds the trail edge of the thermal print media, to the vacuum imaging drum. With this arrangement, loading a sheet of thermal print media and dye donor material requires that the image processing apparatus feed the lead edge of the thermal print media and dye donor material into position just past the vacuum ports controlled by the respective valved chamber. Then vacuum is applied, gripping the lead edge of the a dye donor material against the vacuum imaging drum surface.

Unloading the dye donor material or the thermal print media (to discard the used dye donor material or to deliver the finished thermal print media to an output tray) requires the removal of vacuum from these same chambers so that an edge of the thermal print media or the dye donor material are freed and project out from the surface of the vacuum imaging drum. The image processing apparatus then positions an articulating skive into the path of the free edge to lift the edge further and to feed the dye donor material, to a waste bin or an output tray.

The sheet material exit transports include a dye donor material waste exit and the imaged thermal print media sheet material exit. The dye donor material exit transport comprises a waste dye donor material stripper blade disposed adjacent the upper surface of the vacuum imaging drum. In an unload position, the stripper blade is in contact with the waste dye donor material on the vacuum imaging drum surface. When not in operation, the stripper blade is moved up and away from the surface of the vacuum imaging drum. A driven waste dye donor material transport belt is arranged horizontally to carry the waste dye donor material, which is removed by the stripper blade from the surface of the vacuum imaging drum to an exit formed in the exterior of the image processing apparatus. A waste bin for the waste dye donor material is separate from the image processing apparatus. The imaged thermal print media sheet material exit transport comprises a movable thermal print media sheet material stripper blade that is disposed adjacent to the upper surface of the vacuum imaging drum. In the unload position, the stripper blade is in contact with the imaged thermal print media on the vacuum imaging drum surface. In the inoperative position, it is moved up and away from the surface of the vacuum imaging drum. A driven thermal print media sheet material transport belt is arranged horizontally to carry the imaged thermal print media removed by the stripper blade from the surface of the vacuum imaging drum. It then delivers the imaged thermal print media with the intended image formed thereon to an exit tray in the exterior of the image processing apparatus.

Although the presently known and utilized image processing apparatus is satisfactory, it is not without drawbacks. The DC servo motor that is used to drive the lead screw requires feedback control signals from an expensive, high-precision encoder. With the present arrangement, control circuitry must accept the encoder signal as input and process this feedback signal to obtain the correct output signal for driving the DC servo motor. The need for these added components increases the cost and design complexity of the image processing apparatus.

As an alternative method for providing precise rotational positioning, a stepper motor can be employed. Stepper motors provide precise rotational motion that can be used to rotate a lead screw device in order to provide precise linear motion. The stepper motor has a shaft motion characterized by the capability to achieve discrete angular movements of uniform magnitude based on its input signal. In its simplest implementation, this type of motor is driven by a sequentially switched DC power supply that provides square-wave current pulses rather than analog current values.

Internally, the stepper motor uses magnetic attraction and repulsion of a rotor in discrete steps so that the rotor takes an angular orientation at some integral multiple of a divisor angle that is based on the number and position of stator teeth and on rotor characteristics. To achieve this controlled motion, the stepper motor has two separate windings (A and B). The drive components for the stepper motor coordinate the timing of current to each set of windings so that different internal stator poles have different magnetic states for each rotor position. In a "full step current, 2-phase on" mode, windings A and B are independently energized in one of two discrete current levels, at full current. This arrangement provides highly precise positioning for most stepper motors to, typically, 400 steps per rotation. With 400 steps per rotation, each step moves the rotor 0.9 degrees.

For an image processing apparatus, however, finer resolution than this typical 400 steps per revolution is required. To achieve finer resolution from the stepper motor and lead screw design itself, there would be significant physical and cost limitations. For example, using a lead screw having finer resolution is more costly and requires that the drive motor accelerate and run at faster speeds than may be practical for rapid starting and stopping. This requirement for higher speeds also complicates synchronization between the printhead traversal subsystem and the vacuum drum motor. To overcome this and other limitations, the stepper motor can be used in a microstepping mode. This uses the fact that variable amounts of current through stator windings in turn vary the amount of magnetic force in the stator pole. This allows the rotor to take intermediate angular positions, between the discrete "step" positions described earlier.

In a microstepping mode, the phase current exhibits a voltage-time relationship with discrete steps such that the composite waveform is sinusoidal. With microstepping, the A and B phases are substantially two sine waves with 90 degrees phase shift from each other. Since the rotor position adjusts in some proportion to the magnetic force from stator windings, this allows the rotor to take intermediate positions. This arrangement gives the stepper motor many times the positioning resolution of discrete stepping using square wave current input. Typical upper range achievable using microstepping: 500 microsteps per step. For a motor with 400 steps per revolution, for example, this would allow 200,000 microsteps per revolution.

The tradeoffs with microstepping include variable torque, since different levels of current are flowing for each different position. In addition, since stator windings are energized at some intermediate current level, rather than at full current, rotor position is not as stable as with full step mode. Hence, the accuracy of each microstep is not as precise as is accuracy for full steps. Typically, feedback loops are employed to improve positioning as compensation for this loss of positional accuracy when using microstepping. However, feedback loops require costly design effort and precision feedback components.

The mechanism for printhead positioning in an image processing apparatus must overcome the inherent inaccuracy in microstepping, as described above. This presents particular difficulty for the process of synchronizing printhead positioning at the beginning of each swath. Any additive error that accumulates over the length of the image may cause sizing problems, banding, or other objectionable image anomalies. (A method for handling the above problem is disclosed commonly assigned copending application entitled "Programmable Gearing Control of a Leadscrew for a Printhead Having a Variable Number of Channels" Attorney Docket No. 78184). A further complication that can cause image anomalies is swath-to-swath error that is a result of stepper motor inaccuracy when running in microstepping mode. The periodic behavior of stepper motor positional error can cause visible moire patterns, "beating", or other imaging anomalies on the final image. Each rotation of the vacuum imaging drum writes one swath. With periodic positional error sufficiently out of phase from one swath to the next, the resulting swath pattern can cause objectionable imaging effects U.S. Pat. No. 5,278,578 describes how the error frequency, swath-to-swath, can affect the output image by producing a "beat" frequency that can vary depending on the halftone dot resolution of the image.

There are a number of factors that determine the phase relationship of the periodic positioning error, swath-to-swath. Chiefly, these are: the image resolution, the number of channels that write each swath, the thread pitch of the lead screw, and the stepper motor speed required. Of these factors, the image resolution is typically fixed to one value. Stepper motor speed must be selected within a practical range, considering timing and start-stop requirements. Ideally, the image processing apparatus should support a variable number of channels for the image quality reasons described in the above-cited U.S. Pat. No. 5,329,297.

The use of microstepping to increase the positional addressability of a stepper motor is well-known in the art. Reference materials showing the application of microstepping include the following:

Compumotor Catalog, Step Motor & Servo Motor Systems and Controls, Parker Motion & Control, Rohnert Park, Calif.; Compumotor OEM650 Drive and Drive/Indexer User Guide. P/N 88-013157-02A. Compumotor Division, Parker Hannifin Corporation, Rohnert Park, Calif.; and Data Sheet, IM2000 High Performance Microstepping Controller. Intelligent Motion Systems, Inc., Taftville, Conn.

Patents that disclose methods for increasing the accuracy of a stepper motor in microstepping mode include:

U.S. Pat. No. 4,710,691 which discloses the use of a special apparatus to characterize positional error and correct this error by a process of measurement, adjustment, re-checking, and storing the corrected phase winding current values in memory;

U.S. Pat. No. 4,584,512 which discloses the use of harmonic frequencies of the stepper motor windings current to adjust motor resonance; and U.S. Pat. No. 4,115,726 which discloses the use of odd harmonics for stepping motor compensation.

Selection of a lead screw thread pitch is computed based on factors that are closely coupled. Some of these factors are either fixed, or must be held within certain limits, for practical reasons. For example, the motor that drives the lead screw shaft can only operate with the needed precision over a certain range of speeds. This speed range and the need to be able to write a swath using a variable number of channels are both key factors in determining the pitch of the lead screw. In an image processing apparatus, these factors are known to restrict the possible options for lead screw thread pitch to within a very narrow range of values. As a result, the precision lead screw currently used in the image processing apparatus described above is an expensive component to manufacture and requires complex finishing operations, with ground threads to provide the needed accuracy.

One patent that discloses a method for lead screw selection is U.S. Pat. No. 5,264,949 which discloses a scanning mechanism where the lead screw pitch is specified to provide linear movement of one pixel for an integral number of stepper motor steps. It is significant to note that the apparatus disclosed in this patent does not employ microstepping mode and is limited to incremental scan head movement of a single pixel at a time. The problems addressed by the present invention are significantly more complex in scale, resolution, required accuracy, and flexibility than the problems addressed in U.S. Pat. No. 5,264,949.

Conventional approaches to the problem of precision imaging using a variable number of channels do not provide workable solutions. For example, a stepper motor can be operated only within a certain limited range of speeds. Design of a stepper motor to provide precision positioning over 30 different speeds (for using from 1 to 30 channels) would be difficult and costly. Overall, the acceleration and deceleration characteristics of motors constrain the limits for alternate motor solutions.

SUMMARY OF THE INVENTION

The present invention provides for a unique arrangement which overcomes the problem set forth above. It is an object of the present invention to specify a lead screw pitch that allows synchronous swath-to-swath timing so that a periodic positional error of the printhead position can be controlled with a known phase relationship, one swath to the next. The method of this invention uses the fact that the positional error of the stepper motor in microstepping mode is cyclic, with a frequency that is 4 times the sinusoidal frequency of the composite microstepping current waveform that drives the stepper motor.

It is a further object of the present invention to provide for a method for predicting the phase relationship of swath-to-swath positional error based on the lead screw pitch selection and on the number of channels used to write the swath.

An advantage of the present invention is that it allows the image processing apparatus to be designed so that it limits the number of possible error phase relationships in the positional error, swath to swath, based on the variable number of imaging channels used.

A further advantage of the present invention is that it provides a high degree of positional accuracy over a wide range of channels (from 1 channel to 30 channels), using the known error characteristics of the stepper motor drive system.

A further advantage of the present invention is that, once the error signal for the printhead traversal subsystem is characterized in an image processing apparatus, the solution of this invention can be applied to multiple versions of the same subsystem in manufacture, without the need to test or fine-tune performance for each individual printhead traversal subsystem. (This is provided that the motor torque specified is sufficient for the reflected load.)

A further advantage of the present invention is that it allows the use of a stepper motor to switch between two "stepping" modes in an image processing apparatus: using full-step mode for precise discrete positioning (such as for precisely locating the printhead at the start of a swath or precisely locating the printhead in position anywhere along the lead screw such as for calibration), and then using microstepping mode for higher resolution positional addressability (such as for moving the printhead while writing the swath).

The present invention allows rapid switching of a stepper motor between microstepping mode and the normal stepping mode using full or half steps.

The present invention further allows lead screw pitch sizing that is favorably matched to the application, with consideration for stepper motor speed and related physical design constraints.

The present invention also permits a much coarser (and, therefore, less expensive) lead screw to be used for printhead positioning than with previous apparatuses. The lead screw pitch needed with this invention is on the order of 10 to 20 times the pitch of the lead screw for existing image processing apparatus. Using this invention, the lead screw can be fabricated inexpensively, at less than one-tenth the cost of the lead screw required for existing image processing apparatuses.

The present invention also permits the width of the writing swath to be varied, based on writing with a different number of channels, while allowing the stepper motor that drives the lead screw to operate within its optimal speed range.

The present invention further provides for the precise control of the printhead that is necessary to minimize frequency effects that are known to exist at each discrete swath width that can be used.

The present invention also allows characterization of swath-to-swath error due to the positional error of the stepper motor, so that it is possible to predict the phase error relationship, swath-to-swath, that will appear in an image, based on the number of channels used.

Briefly summarized, according to one aspect of the present invention, the invention resides in an imaging processing apparatus for receiving thermal print media and dye donor materials for processing an intended image onto the thermal print media. A stepper motor in microstepping mode is used to position a printhead to write each swath of the image onto the receiver substrate. The lead screw pitch is selected so that the swath-to-swath positional error on the output image has a known phase relationship based on this positional error frequency and on the number of channels used.

The present invention relates to a method of controlling a movement of a printhead along an imaging drum in an image processing apparatus. The method comprises the steps of: determining a periodic positional error of a stepper motor as measured under load, with the stepper motor driving a lead screw which causes a movement of said printhead; calculating a thread pitch of said lead screw as a product of an inverse resolution in pixels/mm, number of pixels per motor step and number of motor steps per revolution; and adapting the calculated lead screw pitch to permit a control of the periodic positional error and allow a swath width having a plurality of imaging channels.

Although not described in detail, it would be obvious to someone skilled in the art that this invention could be used in other imaging applications that use a stepper motor running in microstepping mode and write the image using an imaging drum. This invention could also be applied to flat-bed as well as other imaging systems and ink jet systems where stepper motors are used.

DETAILED DESCRIPTION OF THE INVENTION

Figure 1:
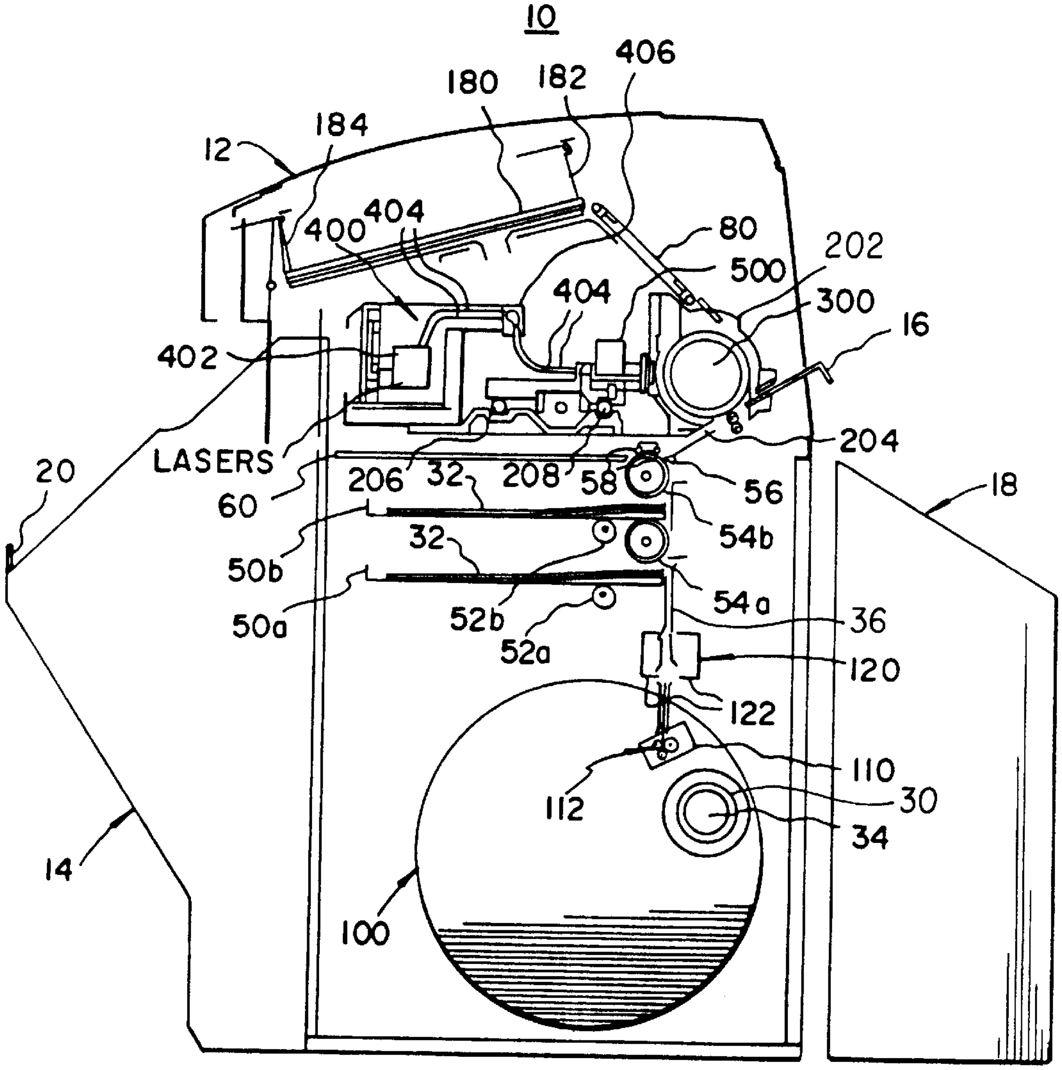
FIG. 1 is a side view in vertical cross section of an image processing apparatus of the present invention.

Referring now to the drawings, wherein like reference numerals designate identical or corresponding parts throughout the several views, FIG. 1 illustrates an image processing apparatus 10 according to the present invention. Image processing apparatus 10 includes an image processor housing 12 which provides a protective cover. A movable, hinged image processor door 14 is attached to a front portion of image processor housing 12 permitting access to two sheet material trays, a lower sheet material tray 50*a* and an upper sheet material tray 50*b*, that are positioned in an interior portion of image processor housing 12 for supporting thermal print media 32 thereon. Only one of sheet material trays 50*a*, 50*b* will dispense thermal print media 32 out of its sheet material tray to create an intended image thereon; the alternate sheet material tray either holds an alternative type of thermal print media 32 or functions as a back up sheet material tray. In this regard, lower sheet material tray 50*a* includes a lower media lift cam 52*a* for lifting lower sheet material tray 50*a* and ultimately thermal print media 32, upwardly toward a rotatable, lower media roller 54*a* and toward a second rotatable, upper media roller 54*b* which, when both are rotated, permits thermal print media 32, in lower sheet material tray 50*a*, to be pulled upwardly towards a movable media guide 56. Upper sheet material tray 50*b* includes an upper media lift cam 52*b* for lifting upper sheet material tray 50*b* and ultimately thermal print media 32 towards upper media roller 54*b* which directs it towards movable media guide 56.

Movable media guide 56 directs thermal print media 32 under a pair of media guide rollers 58 which engage thermal print media 32 for assisting upper media roller 54*b* in directing it onto a media staging tray 60. Media guide 56 is attached and hinged to a lathe bed scanning frame 202(FIG. 2) at one end, and is uninhibited at its other end for permitting multiple positioning of media guide 56. Media guide 56 then rotates its uninhibited end downwardly, as illustrated in the position shown in FIG. 1, and the direction of rotation of upper media roller 54*b* is reversed for moving thermal print media 32 resting on media staging tray 60 under the pair of media guide rollers 58, upwardly through entrance passageway 204 and around a rotatable vacuum imaging drum 300.

A roll 30 of dye donor roll material 34 is connected to media carousel 100 in a lower portion of image processor housing 12. Four rolls 30 are used, but only one is shown for clarity. Each roll 30 includes a dye donor roll material 34 of a different color, typically black, yellow, magenta and cyan. These dye donor roll materials 34 are ultimately cut into dye donor sheet materials 36 (shown in FIG. 5) and passed to vacuum imaging drum 300 for forming the medium from which dyes imbedded therein are passed to thermal print media 32 resting thereon, which process is described in detail herein below. In this regard, a media drive mechanism 110 is attached to each roll 30 of dye donor roll material 34, and includes three media drive rollers 112 through which the dye donor roll material 34 of interest is metered upwardly into media knife assembly 120. After dye donor roll material 34 reaches a predetermined position, media drive rollers 112 cease driving the dye donor roll material 34 and two media knife blades 122 positioned at a bottom portion of media knife assembly 120 cut the dye donor roll material 34 into dye donor sheet materials 36. Lower media roller 54*a* and upper media roller 54*b* along with media guide 56 then pass the dye donor sheet material 36 onto media staging tray 60 and ultimately to vacuum imaging drum 300 and in registration with thermal print media 32 using the same process as described above for passing thermal print media 32 onto vacuum imaging drum 300. Dye donor sheet material 36 now rests atop thermal print media 32 with a narrow space or gap between the two created by microbeads imbedded in the surface of thermal print media 32.

A laser assembly 400 includes a quantity of laser diodes 402 in its interior. Laser diodes 402 are connected via fiber optic cables 404 to a distribution block 406 and ultimately to a printhead 500. Printhead 500 directs thermal energy received from laser diodes 402 causing dye donor sheet material 36 to pass the desired color across the gap to thermal print media 32. Printhead 500 is attached to a lead screw 250 (shown in FIG. 2) via a lead screw drive nut 254 and a drive coupling (not shown) for permitting movement axially along the longitudinal axis of vacuum imaging drum 300. This permits a transferring of data to create the intended image onto thermal print media 32. A linear drive motor 258 can be used to drive lead screw 250, while end cap 268 is mounted at an end of lead screw 250.

For writing, vacuum imaging drum 300 rotates at a constant velocity, and printhead 500 begins at one end of thermal print media 32 and traverses the entire length of thermal print media 32 for completing the transfer process for the particular dye donor sheet material 36 resting on thermal print media 32. After printhead 500 has completed the transfer process, for the particular dye donor sheet material 36 resting on thermal print media 32, dye donor sheet material 36 is then removed from vacuum imaging drum 300 and transferred out of image processor housing 12 via skive or ejection chute 16(FIG. 1). As shown in FIG. 1, dye donor sheet material 36 eventually comes to rest in a waste bin 18 for removal by the user. The above described process is then repeated for the other three rolls 30 of dye donor roll materials 34.

After the color from all four sheets of dye donor sheet materials 36 have been transferred and dye donor sheet materials 36 have been removed from vacuum imaging drum 300, thermal print media 32 is removed from vacuum imaging drum 300 and transported via a transport mechanism 80 to a dye binding assembly 180. An entrance door 182 of dye binding assembly 180 is opened for permitting thermal print media 32 to enter dye binding assembly 180, and shuts once thermal print media 32 comes to rest in dye binding assembly 180. Dye binding assembly 180 processes thermal print media 32 for further binding the transferred colors on thermal print media 32 and for sealing the microbeads thereon. After the color binding process has been completed, a media exit door 184 is opened and thermal print media 32 with the intended image thereon passes out of dye binding assembly 180 and image processor housing 12 and comes to rest against a media stop 20.

Figure 2:
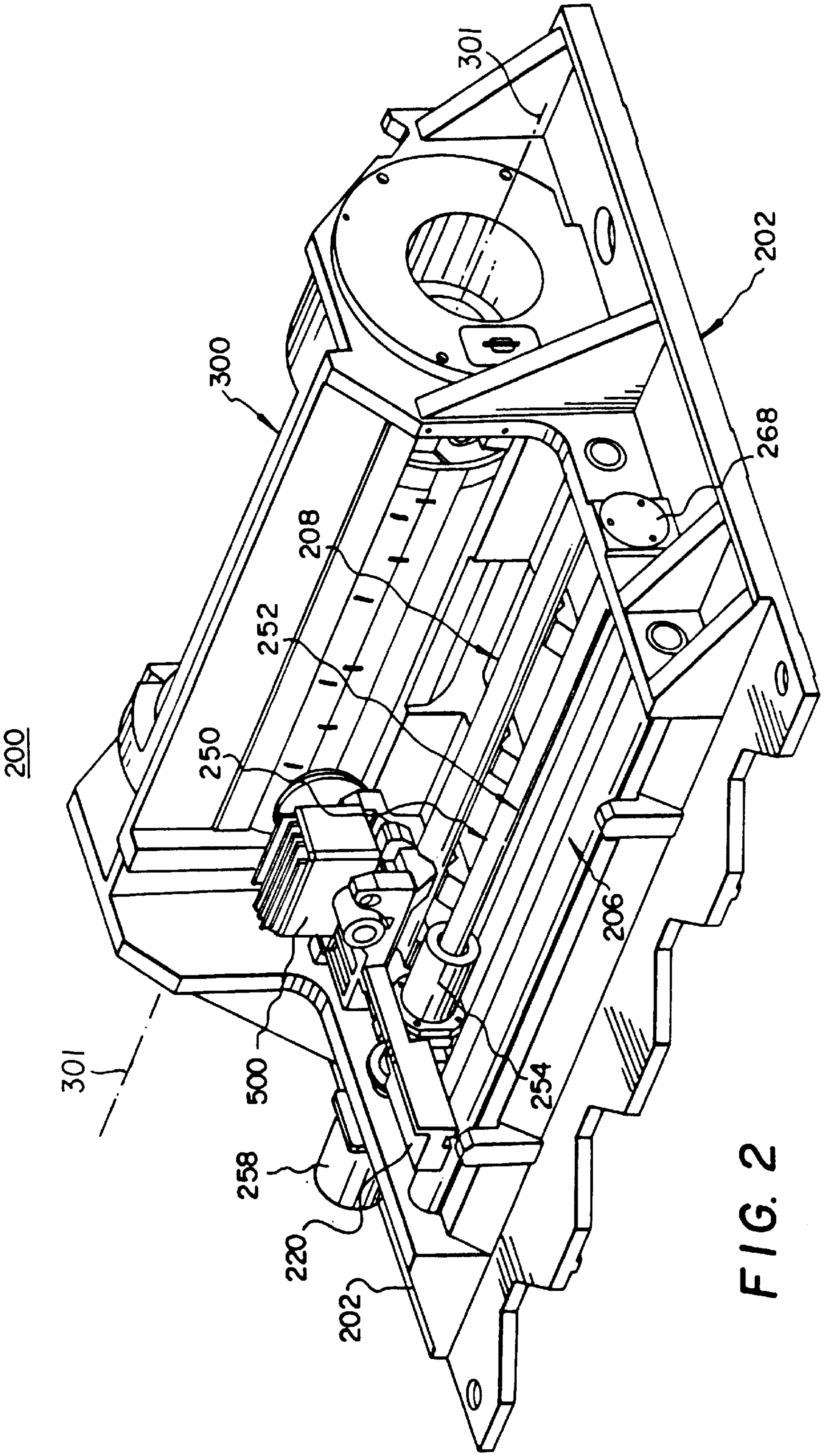
FIG. 2 is a perspective view of a lathe bed scanning subsystem or write engine of the present invention.

Referring to FIG. 2, there is illustrated a perspective view of a lathe bed scanning subsystem 200 of image processing apparatus 10, including vacuum imaging drum 300, printhead 500 and lead screw 250 assembled in lathe bed scanning frame 202. Vacuum imaging drum 300 is mounted for rotation about an axis 301 in lathe bed scanning frame 202. Printhead 500 is movable with respect to vacuum imaging drum 300, and is arranged to direct a beam of light to dye donor sheet material 36. The beam of light from printhead 500 for each laser diode 402 (not shown in FIG. 2) is modulated individually by modulated electronic signals from image processing apparatus 10, which are representative of the shape and color of the original image; so that the color on dye donor sheet material 36 is heated to transfer the dye only in those areas in which its presence is required on the thermal print media 32, to reconstruct the shape and color of the original image.

Printhead 500 is mounted on a movable translation stage member 220 which, in turn, is supported for low friction slidable movement on translation bearing rods 206 and 208. Translation bearing rods 206 and 208(rear and front) are sufficiently rigid so as not to sag or distort as is possible between their mounting points and are arranged as parallel as possible with axis 301 of vacuum imaging drum 300. An axis of printhead 500 is perpendicular to axis 301 of vacuum imaging drum 300 axis. Front translation bearing rod 208 locates translation stage member 220 in vertical and horizontal directions with respect to axis 301 of vacuum imaging drum 300. Rear translation bearing rod 206 locates translation stage member 220 only with respect to rotation of translation stage member 220 about front translation bearing rod 208 so that there is no over-constraint condition of translation stage member 220 which might cause it to bind, chatter, or otherwise impart undesirable vibration or jitters to printhead 500 during the generation of an intended image.

Figure 3:
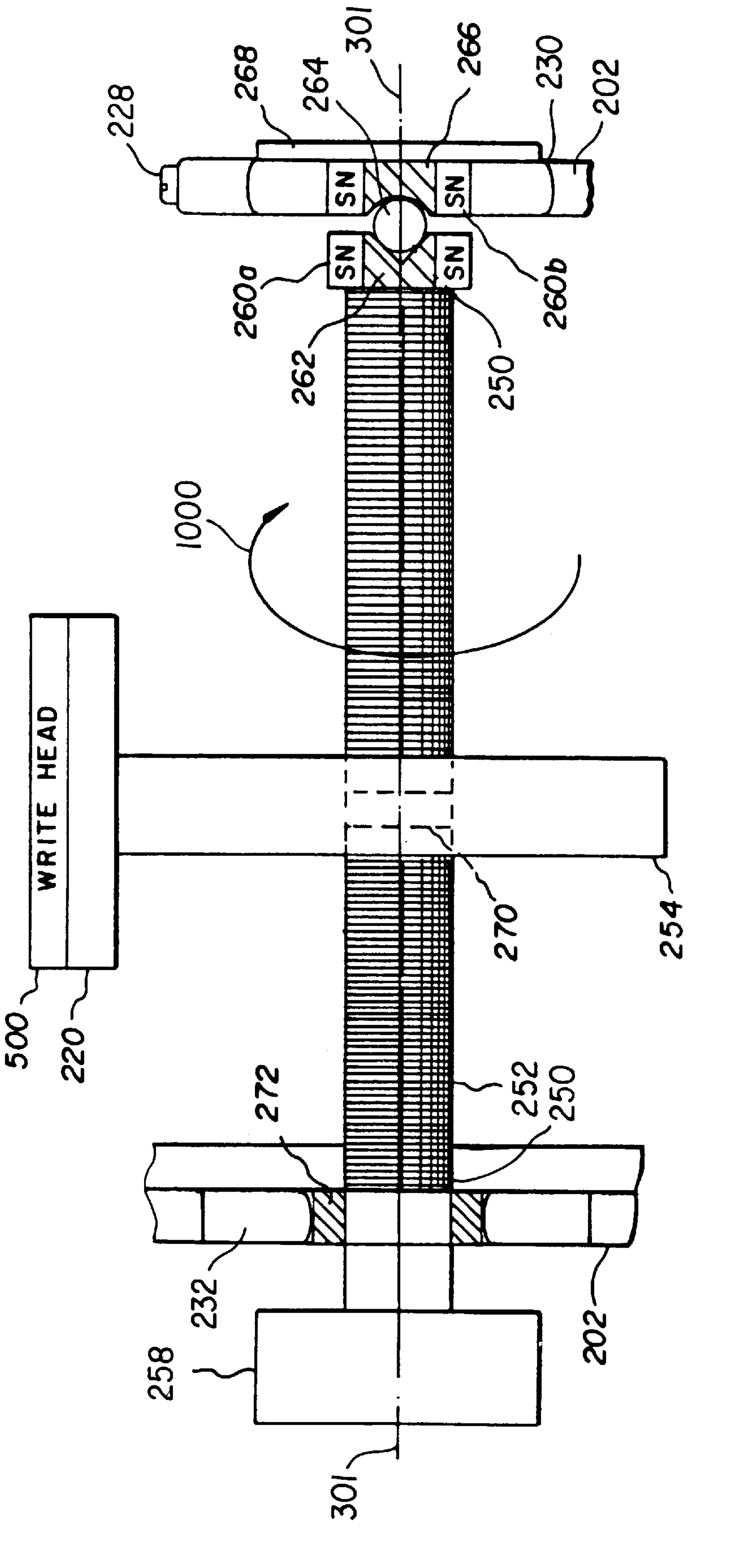
FIG. 3 is a top view in horizontal cross-section, partially in phantom, of the lead screw of the present invention.

Referring to FIGS. 2 and 3, lead screw 250 is shown which includes elongated, threaded shaft 252 which is attached to linear drive motor 258 on its drive end and to lathe bed scanning frame 202 by means of a radial bearing 272. Lead screw drive nut 254 includes grooves in its hollowed-out center portion 270 for mating with the threads of threaded shaft 252 for permitting lead screw drive nut 254 to move axially along threaded shaft 252 as threaded shaft 252 is rotated by linear drive motor 258. Lead screw drive nut 254 is integrally attached to printhead 500 through a lead screw coupling (not shown) and translation stage member 220 at its periphery, so that as threaded shaft 252 is rotated by linear drive motor 258 lead screw drive nut 254 moves axially along threaded shaft 252, which in turn moves translation stage member 220 and ultimately printhead 500 axially along vacuum imaging drum 300.

As best illustrated in FIG. 3, an annular-shaped axial load magnet 260*a* is integrally attached to the driven end of threaded shaft 252, and is in a spaced apart relationship with another annular-shaped axial load magnet 260*b* attached to lathe bed scanning frame 202. Axial load magnets 260*a* and 260*b* are preferably made of rare-earth materials such as neodymium-iron-boron. A generally circular-shaped boss part 262 of threaded shaft 252 rests in a hollowedout portion of annular-shaped axial load magnet 260*a*, and includes a generally V-shaped surface at the end for receiving a ball bearing 264. A circular-shaped insert 266 is placed in a hollowed-out portion of the other annular-shaped axial load magnet 260*b*, and includes an accurate-shaped surface on one end for receiving ball bearing 264, and a flat surface at its other end for receiving end cap 268. End cap 268 is placed over annular-shaped axial load magnet 260*b* and attached to lathe bed scanning frame 202 for protectively covering annular-shaped axial load magnet 260*b* and providing an axial stop for lead screw 250. Circular shaped insert 266 is preferably made of material such as Rulon J™ or Delrin AF™, both well known in the art.

Lead screw 250 operates as follows. Linear drive motor 258 is energized and imparts rotation to lead screw 250, as indicated by the arrow 1000, causing lead screw drive nut 254 to move axially along threaded shaft 252. Annular-shaped axial load magnets 260*a* and 260*b* are magnetically attracted to each other which prevents axial movement of lead screw 250. Ball bearing 264, however, permits rotation of lead screw 250 while maintaining the positional relationship of annular-shaped axial load magnets 260*a*, 260*b*, i.e., slightly spaced apart, which prevents mechanical friction between them while obviously permitting threaded shaft 252 to rotate.

Figure 5B:
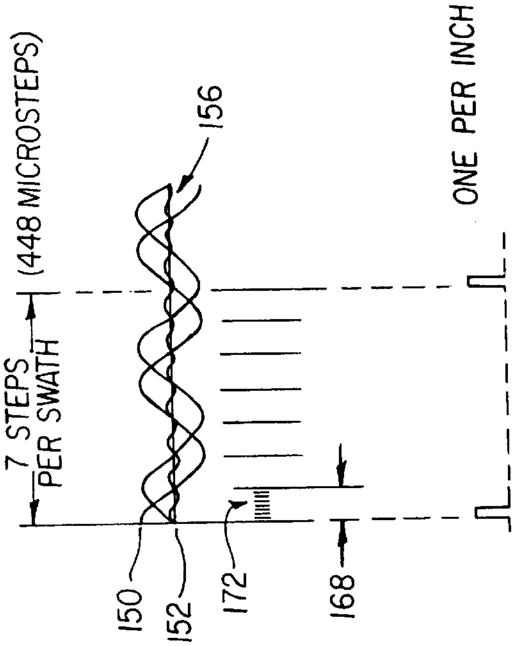
FIGS. 5*a*–5*b* illustrate, in block diagram form, the timing relationships required to print a single swath of an output image.
Figure 5A:
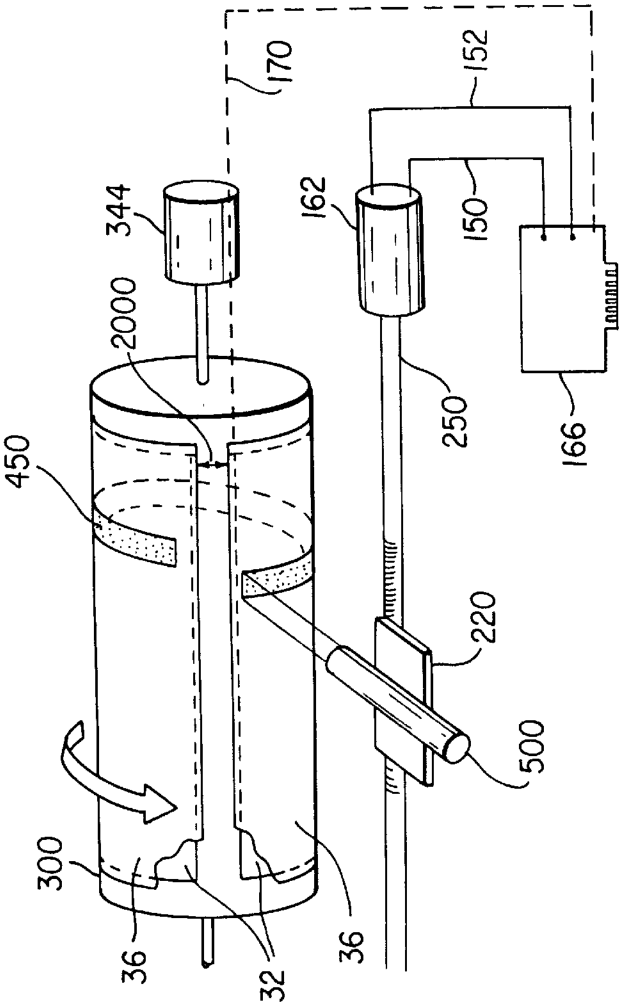
Figure 9:
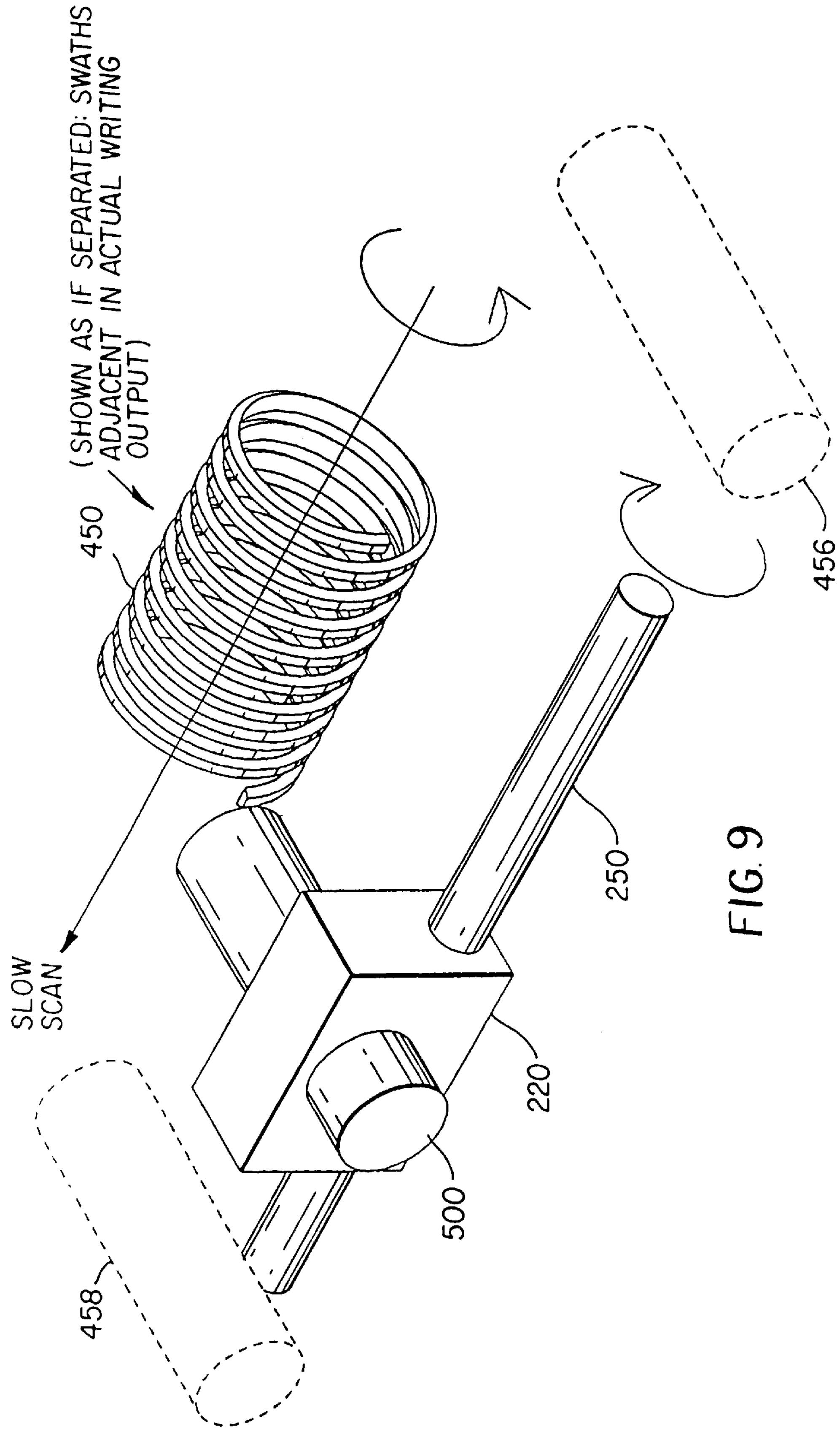
FIG. 9 shows the overall helical pattern of swaths as printed onto the drum-mounted receiver medium by the printhead.

Printhead 500 travels in a path along vacuum imaging drum 300, while being moved at a speed synchronous with a rotation of vacuum imaging drum 300 and proportional to the width of a writing swath 450 as shown in FIGS. 5*a*, 5*b* and 9. The pattern that printhead 500 transfers to thermal print media 32 along vacuum imaging drum 300, is a helix. FIG. 9 illustrates the principle for generating writing swaths 450 in this helical pattern. (This figure is not to scale;

writing swath 450 itself is typically 250–300 microns wide.) Reference numeral 456 in FIG. 9 represents a position of printhead 500 at the beginning of the helix, while reference numeral 458 represents a position of printhead 500 at the end of the helix.

Figure 4A:
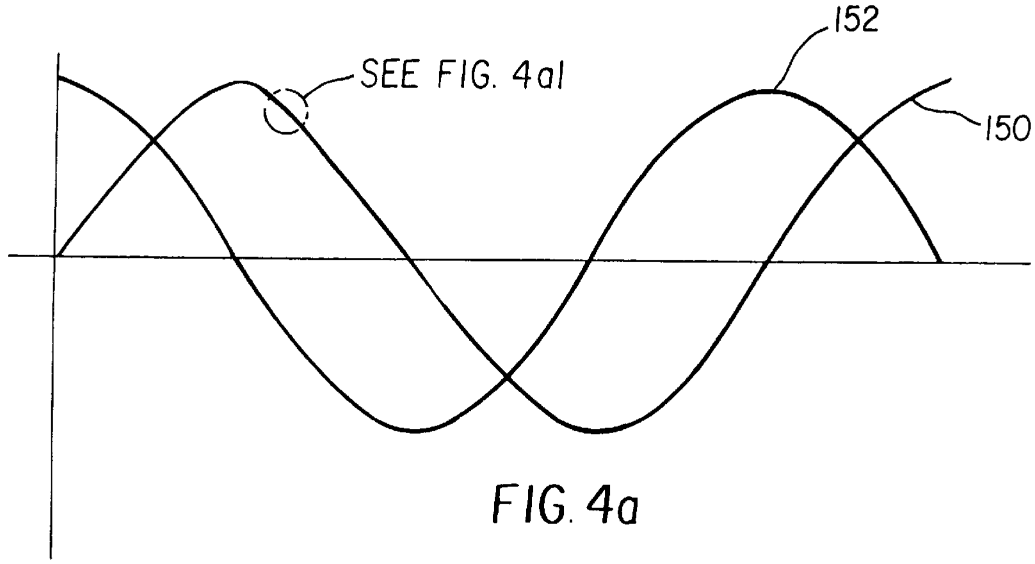
FIGS. 4*a*–4*f* show a series of signal waveforms for microstepping using the techniques of the present invention.

FIG. 4*a* shows both phases of a microstepping current waveform, phase A 150 and phase B 152, shifted 90 degrees relative to each other for driving a stepper motor 162 shown in FIG. 5*a*. As shown in FIG. 5*a*, stepper motor 162 is actuated to rotate lead screw 250 and thereby impart a translational movement to printhead 500 along the surface of vacuum imaging drum 300. FIG. 4*a* shows how the microstepping current waveform, although generally sinusoidal, actually comprises a series of discrete steps 160. Using conventional integrated circuit devices such as the IM 2000 Microstepping Controller, this waveform can be shaped by means of a look-up table that sets specific values for each discrete microstep.

Figure 4B:
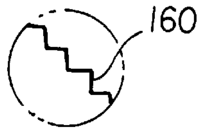
Figure 4B:
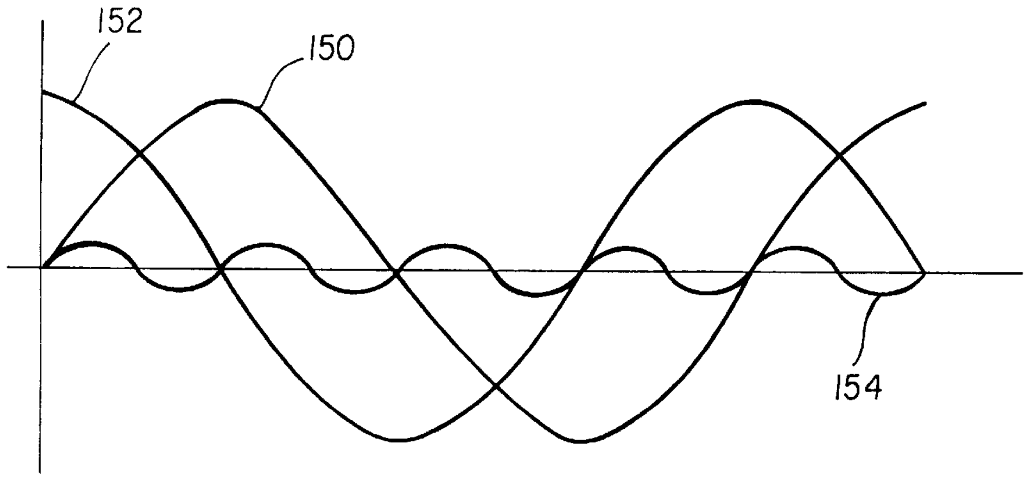

FIG. 4*b* shows both phases, phase A 150 and phase B 152, of the microstepping current waveform with a positional error 154 represented in the same time domain.

Figure 4C:
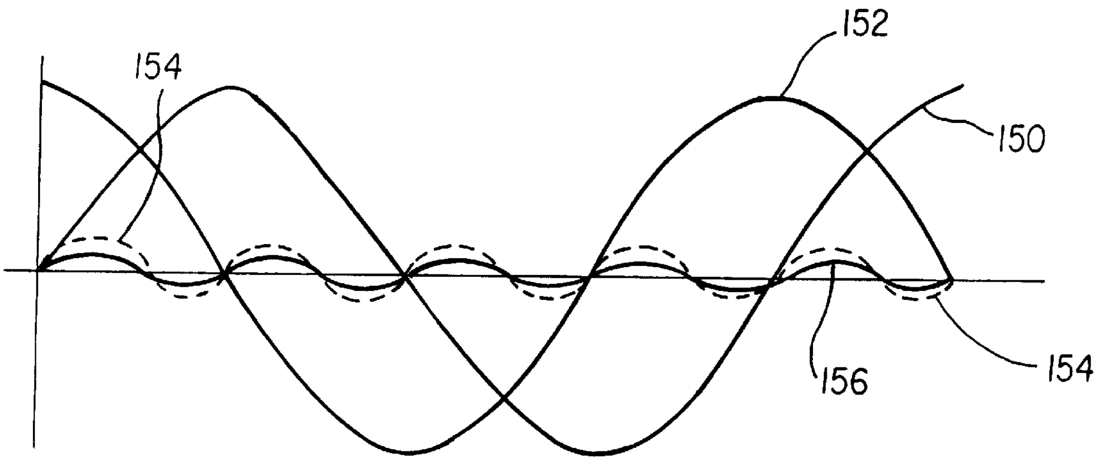
Figure 4D:
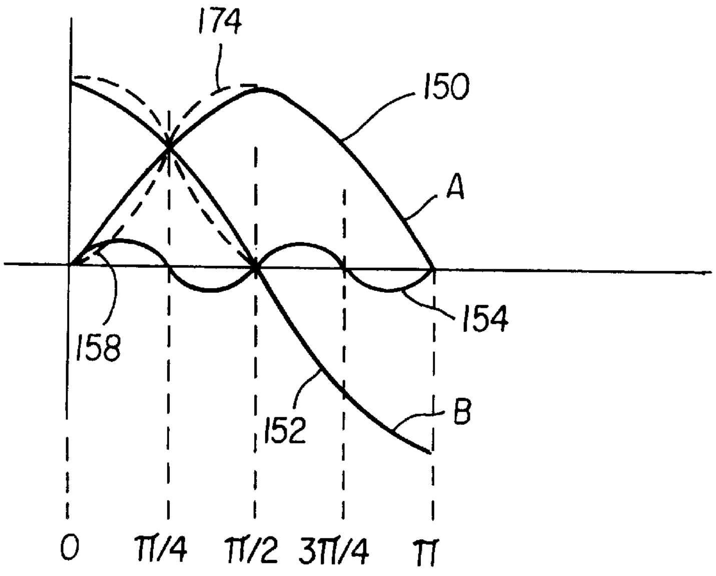
Figure 4E:
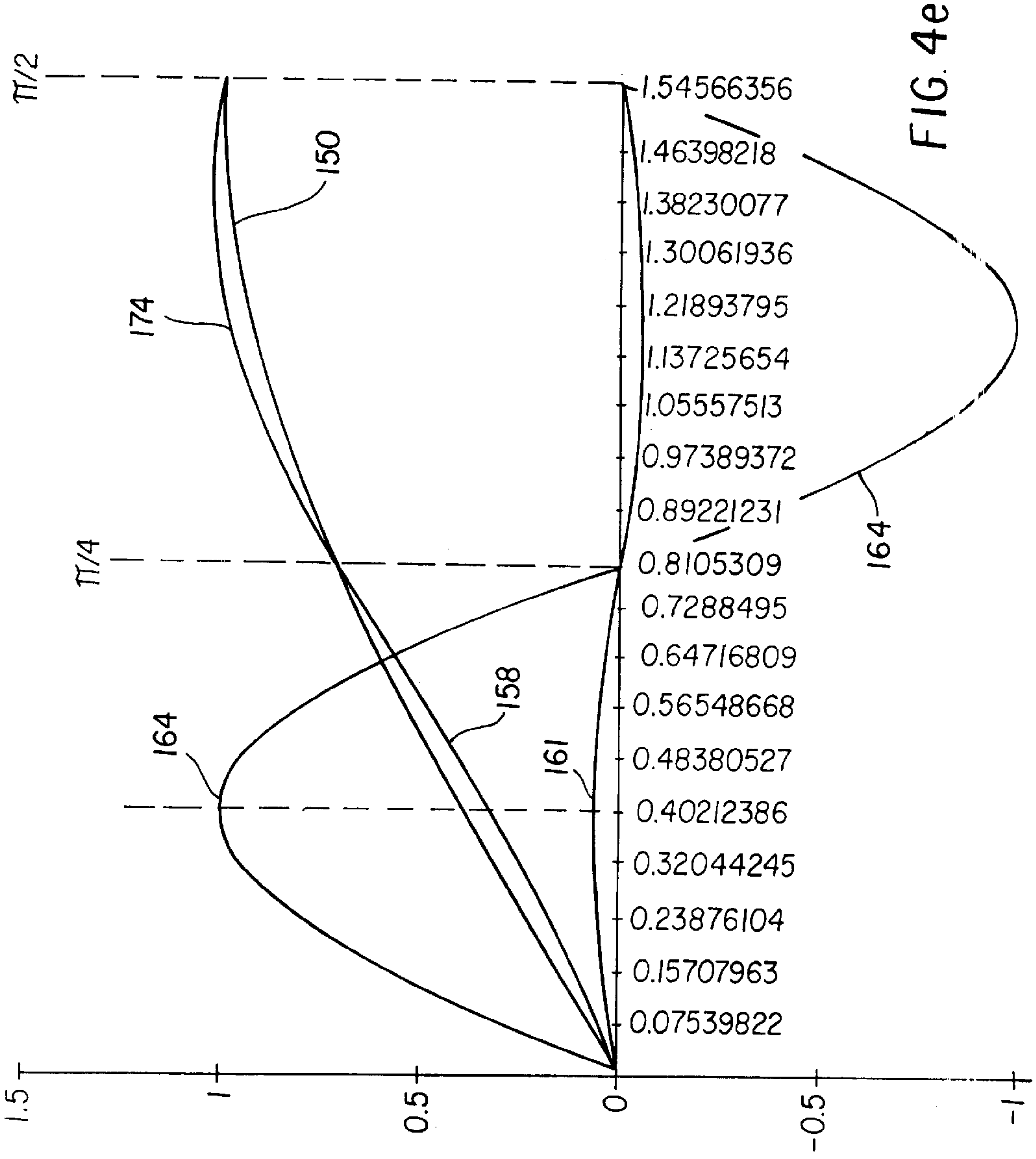
Figure 4F:
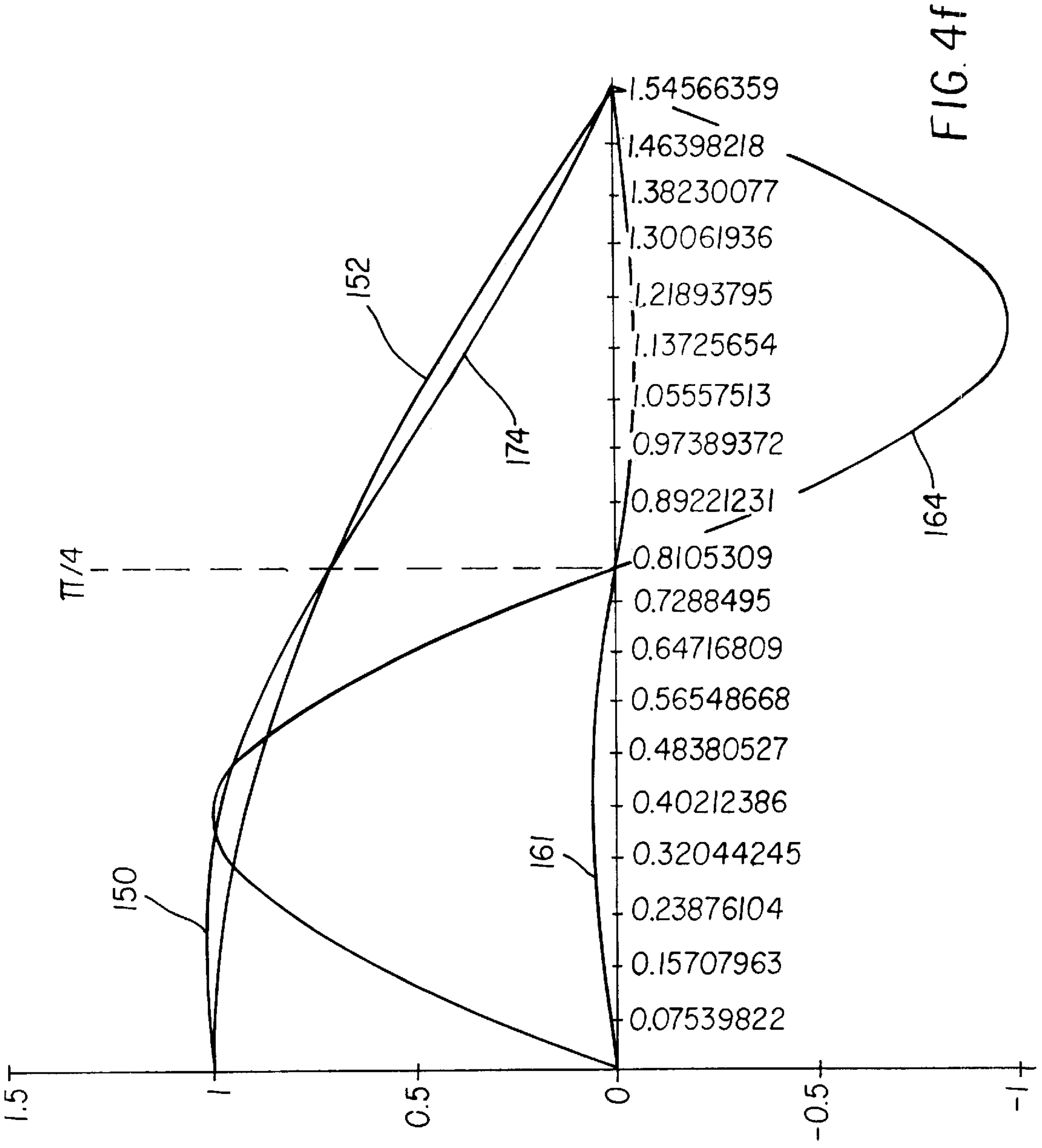

The graph of FIG. 4*e* is normalized to illustrate the periodic behavior of windings current for phase A 150 versus positional error 154. FIG. 4*e* shows only a quarter-cycle of phase A 150 waveform. (The same corresponding periodic relationship with positional error 154 applies for phase B 152 as is shown in FIG. 4*f*.) Positional error 154, computed from encoder data, is typically expressed in microns. In the embodiment described for this invention, this positional error is approximately 6 microns peak-to-peak, uncorrected. As is shown in FIGS. 4*b* and 4*e*, positional error 154 is generally sinusoidal at 4 times the frequency of the composite waveforms. Positional error 154 is at zero 8 times during each full cycle of the current waveform, with the timing shown in FIG. 4*b*.

Phase A 150 and phase B 152 currents have a predictable relationship to each other at each "zero-crossing" of positional error 154. Zero crossing of positional error 154 occurs when stepper motor 162 is most stable. As FIG. 4*b* shows, zero-crossing of positional error 154 waveform occurs when both phase currents, phase A 150 and phase B 152, have essentially equal magnitude (with the same or with opposite polarity), and when either phase current is at zero. (Note that these are the stable states of stepper motor 162 when it operates in standard "half-step" mode. Stable states in "full-step" mode occur when either phase current is at zero.) This invention uses this timing relationship of positional error 154 to the sinusoidal phase current waveforms that drive the motor. By synchronizing motion when positional error 154 is zero, this invention minimizes the error in the subsystem that positions printhead 500.

It should be noted that positional error 154 is measured in linear distance, but is caused by rotational error of stepper motor 162 that drives lead screw 250. The pitch of lead screw 250 determines how much linear positional error 154 results from stepper motor 162 inaccuracy.

A linear positional error 154 of 6 microns peak-to-peak is excessive, considering the need for accuracy swath-to-swath and the additive nature of positional error of printhead 500 as it moves from one side of the intermediate on vacuum imaging drum 300 to the other. (Pixels themselves are spaced only 10 microns apart.) To reduce this printhead 500 positional error, a method disclosed in a commonly assigned related application "Method for Compensating for Positional Error Inherent to Stepper Motors Running in Microstepping Mode" Attorney Docket No. 78003, filed on Jul. 29, 1998, applies a waveform-shaping scheme as represented in FIG. 4*d*. FIG. 4*d* shows radians as 0, π/4, π/2, 3π/4 and π for the phase signals, phase A 150 and phase B 152, and shows the 4X positional error 154 frequency for reference only.)

As FIG. 4*d* shows, the phase B current 152 is slightly increased over the 0–π/4 interval of the waveform, then decreased over the π/4–π/2 interval of the waveform. The phase A current 150 is decreased over the 0–π/4 interval and increased over the π/4–/2 interval.

FIG. 4*e* shows the effect of this waveform shaping in finer detail, over the first quarter-cycle of phase A 150. Note that positional error 154 is represented by reference numeral 164 (error profile) and is shown as a dimensionaless function with an amplitude of 1. The phase A 150 waveform is slightly attenuated over the 0–π/4 radians interval 158. This waveform-shaping then amplifies the phase A 150 waveform over the π/4–π/2 interval 174. The same principles applied to the FIG. 4*e* which represents corrections to phase A 150 that is represented by a sine wave, apply to FIG. 4*f* which represents corrections to phase B 152 that is represented by a cosine wave. Further with respect to FIG. 4*e*, as represented by a sine wave, reference numeral 158 represents the fully corrected waveform for the first quadrant 0–π/4; reference numeral 164 represents the error profile for the frequency shown (frequency=4x); and reference numeral 174 represents the fully corrected waveform for the second quadrant π/4–π/2. The same applies to FIG. 4*f* as represented by a cosine wave. Further with respects to FIGS. 4*e* and 4*f*, reference numeral 161 represents the normalized positional error profile 164 multiplied by 0.06 which is determined empirically as taught in the above-mentioned co-pending application, Attorney Docket No. 78003.

In practice, the amount of increase or decrease for wave shaping at each discrete microstep is computed on a prototype system using instrumentation to measure positional error 154 under load. Empirical results clearly show that computations from such a system can then be applied for waveform-shaping with repeatable performance by subsystems designed with the same mechanical tolerances and motor specification. (The stepper motor must have sufficient torque relative to the reflected torque of the load typically greater than 10×.) This allows manufactured subsystems to operate "open-loop" using the calculated waveform-shaping procedure disclosed by the related invention referenced above. (The corrected value computed using the procedure disclosed in this related invention is then used as the look-up table value used to set the windings current for the phase at the specific discrete microstep considered.)

By using this procedure, positional error 154 for the implementation described in this invention can be reduced to approximately 2 microns peak-to-peak, as is indicated by reduced positional error 156 represented in FIG. 4*c*(the dotted line in FIG. 4*c* represents positional error 154).

By characterizing positional error 154 and compensating for this error by shaping the current waveforms, the method disclosed in the related application noted above allows the subsystem that drives printhead 500 to use a coarser screw pitch than with previous systems (such as the existing image processing apparatus for proof generation, cited above). This reduces the cost of lead screw 250 to less than one-tenth the cost of the precision lead screw required for existing image processing apparatuses. Using the method of the described invention, lead screw 250 can be fabricated using rolled threads versus the treated, ground threads required with existing image processing apparatuses. Lead screw 250 thread pitch can be selected over a nominal range of 10–20 mm versus the 0.050-in. (1.27 mm) thread pitch required for the earlier image processing apparatuses.

FIGS. 5*a* and 5*b* show, in simplified block diagram form, the timing relationships and typical values for the implementation described here. FIG. 5*a* shows the mechanical components whose interrelated operation writes the series of writing swaths 450 from printhead 500 to the sheet of thermal print media 32 that is wrapped around vacuum imaging drum 300 (a single writing swath 450 is represented in FIG. 5*a*, not to scale). As drum 300 rotates, lead screw 250, driven by stepper motor 162, rotates to move printhead 500, mounted on translation stage member 220. Stepper motor 162 has 400 full steps 168 per revolution, in this embodiment. A stepper motor controller 166 drives stepper motor 162 in microstepping mode, with the timing relationships shown in FIG. 5*b*. With this embodiment, stepper motor 162 requires 7 full steps 168 per writing swath 450. In the embodiment described here, microstepping allows 64 microsteps 172 per step, so that the full writing swath 450 requires 448 microsteps 172. (As will be shown below, the number of full steps 168 per writing swath 450 can be varied, using the method disclosed in this invention.)

Printhead 500 movement stops momentarily over a "dead band" 2000 (where no sheet is present) at leading and trailing edges of the sheet of thermal print media 32 that is mounted on vacuum imaging drum 300.

A drum encoder 344 is operationally associated with vacuum imaging drum 300. An index pulse 170 from drum encoder 344 for rotating vacuum imaging drum 300 serves to synchronize the timing of stepper motor 162. As FIG. 5*b* shows, this synchronization is performed when reduced positional error 156 of stepper motor 162 is at zero.

This embodiment allows stepper motor 162 to operate in both full-step mode and in microstepping mode. While writing swath 450, as described above, stepper motor 162 operates in microstepping mode. Then, when necessary to move accurately to a different position, stepper motor 162 can be run in full-step mode. (Recall that the positional accuracy in full-step mode is inherently better than the accuracy of the same motor when in microstepping mode.)

The provisions for an ideal lead screw 250 thread pitch will now be explained based on the following equation. (For the following description, the term "lead screw pitch" is intended to mean "lead screw thread pitch".)

As noted above, a requirement for printhead 500 is that it be able to write using a number of channels simultaneously. Ideally, this number of channels can be variable from one full image to the next (or from one color separation to the next). Typical number of channels used, for example, include 28, 24, 12, and others. With this requirement in mind, it is useful to first consider the simplest case, wherein stepper motor 162 advances one full step for each channel. With this arrangement, the equation for ideal lead screw 250 pitch becomes the following:

$$\frac{1}{\text{resolution}\left(\frac{\text{pixels}}{\text{mm}}\right)} \cdot \frac{1 \text{ pixel}}{\text{motor step}} \cdot \frac{\text{motor steps}}{\text{rev}} = \frac{\text{mm}}{\text{rev}}$$

A resolution of 2540 dots per inch (dpi) gives 100 pixels/mm. With a 400-step/revolution stepper motor 162, the above equation then becomes:

$$\frac{1}{\text{resolution}\left(\frac{100 \text{ pixels}}{\text{mm}}\right)} \cdot \frac{1 \text{ pixel}}{\text{motor step}} \cdot \frac{400 \text{ motor steps}}{\text{rev}} = \frac{4 \text{ mm}}{\text{rev}}$$

Resolution and number of motor steps are fixed values for the image processing apparatus. The number of pixels per motor step can vary, with a corresponding affect on the lead screw 250 pitch that is computed. For example, a system can employ 4 pixels per motor step provided a microstepping drive is used, such that an integral number of microsteps per pixel can be used. Otherwise, a cumulative positional error will occur resulting in image compression or expansion.

In another example, 3 pixels per motor step can be used, however, since this will not result in an integral number of microsteps per pixel, the imaging apparatus must use a number of channels which is a multiple of 3.

Figure 6A:
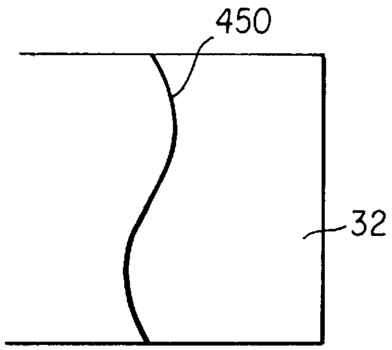
FIGS. 6*a*–6*e* give a sequence of swath patterns that illustrate the principles used by this invention.

For writing a writing swath 450 that is one pixel wide, with lead screw 250 at 4 mm/rev that advances one full step per pixel, writing swath 450 has a periodic error characteristic as represented in FIG. 6*a*. This figure exaggerates the effect of positional error 154 described above for the purpose of illustrating the swath-to-swath error-phase relationship used by this invention. (Precise measurement shows that writing swath 450 exhibits the periodic sinusoidal variation down the length of the image, as represented in FIG. 6*a*. The actual error measurement is typically 2 to 6 microns, peak-to-peak.)

Figure 6B:
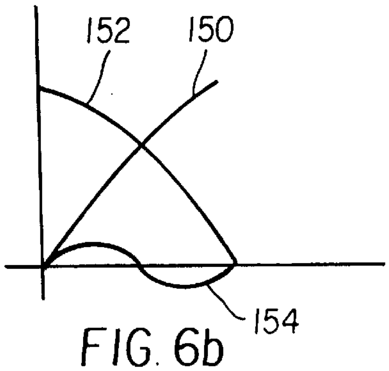

Note from FIG. 6*b* that positional error 154 cycles through one full period over this full step of stepper motor 162. Note from FIG. 6*c* that the next one-pixel writing swath 450 is then written with this periodic positional error 154 characteristic in phase with the first writing swath 450 written (FIG. 6*a*). Each subsequent writing swath 450 then has this same in-phase relation to each preceding writing swath 450. As a result, there is no visible error that appears in the final image. Errors in phase will not be visibly apparent.

Figure 6C:
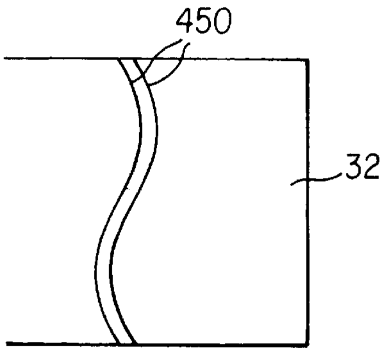
Figure 6D:
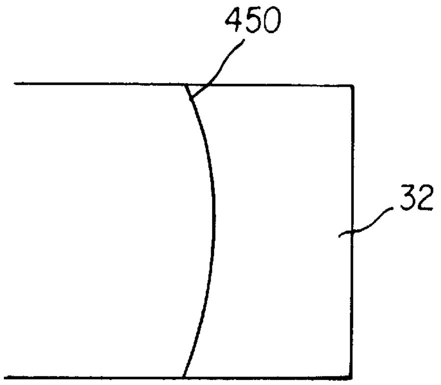
Figure 6E:
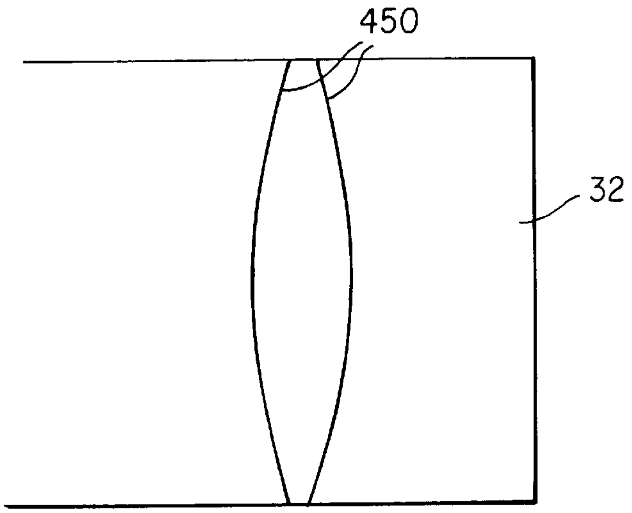

In terms of computation and visualization, FIGS. 6*a* and 6*c* show the simplest case. However, the computed lead screw 250 pitch of 4 mm/rev is not practical when using many channels for this application because it requires stepper motor 162 to move at higher speeds than are feasible, given the start-stop nature of the application and the precision required. Doubling the lead screw 250 pitch to 8 mm/rev reduces the required stepper motor 162 speed by 50%, effectively bringing the speed of stepper motor 162 into an acceptable range for the imaging application. However, with an 8 mm pitch of lead screw 250, the one-pixel writing swath 450 now writes over only one-half cycle of positional error 154. FIG. 6*d* shows the effect of using an 8 mm/rev pitch for lead screw 250, with all other variables held equal. Note from FIG. 6*e* that the next one-pixel writing swath 450 is then 180 degrees out of phase with the first writing swath 450. Following this pattern, each subsequent writing swath 450 is 180 degrees out of phase with its preceding writing swath 450.

It must be noted that the above examples concern themselves with using a writing swath 450 that is one pixel wide. The intent of the design, however, is to write a writing swath 450 that is several pixels wide. Consideration of the phase relationship of successive writing swaths 450 shows where the imaging anomalies can occur and shows how this invention can be implemented. (For the description that follows, the term "swath" refers to a multiple-channel swath and not to a one-pixel writing swath 450 unless explicitly specified.)

Figure 7A:
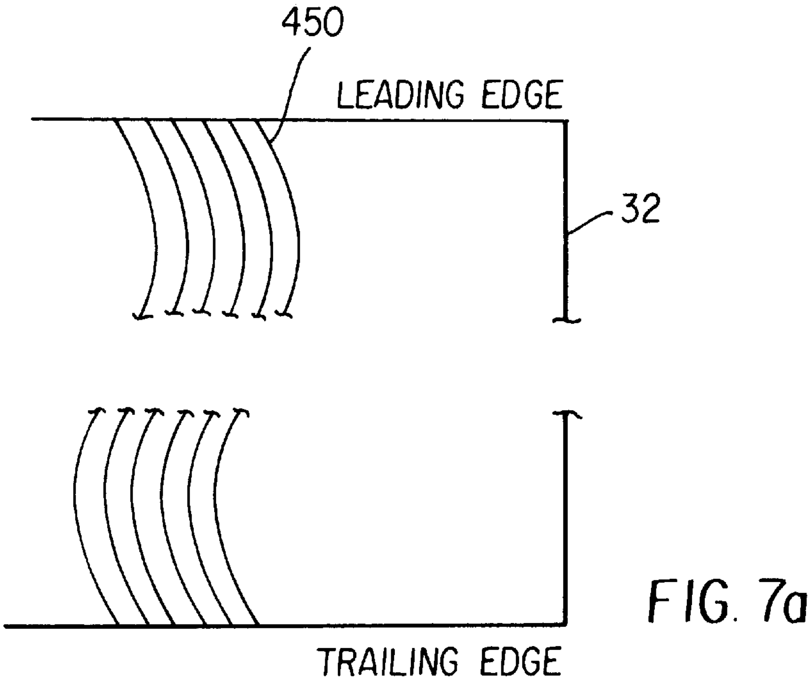
FIGS. 7*a*–7*e* show possible swath-to-swath error phase relationships using this invention.

Extending the example of FIG. 6*a* to a writing swath 450, it is clearly apparent that this example represents the best possible case. Here, all writing swaths 450 are in-phase relative to the periodic error characteristic. To implement this for a writing swath 450, stepper motor 162 takes one full step 168 for each channel. For an ideal case with 4 channels and a 4 mm/rev pitch for lead screw 250, this gives the in-phase writing swath 450 arrangement represented in FIG. 7*a*. (FIG. 7*a* represents the swath-to-swath periodic error characteristic as it would appear at the leading and trailing edges of the image.)

Figure 7B:
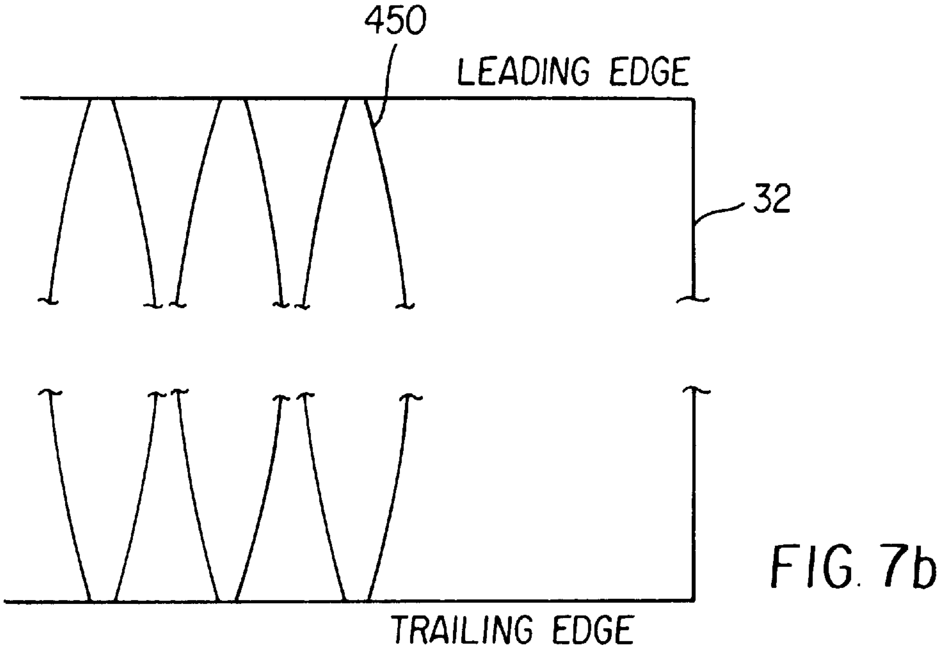

Extending the example of FIG. 6*d* to a writing swath 450 shows where imaging problems can occur. Here, successive writing swaths 450 are 180 degrees out of phase, as is illustrated in the simple example of FIG. 7*b*. (FIG. 7*b* also represents the swath-to-swath periodic error characteristic as it would appear at the leading and trailing edges of the image.) This occurs because the 4 mm/rev pitch for lead screw 250 is not practical, and a higher value is needed, for example, an 8 mm/rev lead screw 250. But the 8 mm/rev lead screw 250 then causes the printhead to write 2 channels per motor step. To write a 3-channel wide writing swath 450, the writing swath 450 ends on a half-step of stepper motor 162. The next writing swath 450 begins with the error characteristic 180 degrees out of phase, as represented in FIG. 7*b*.

The foregoing example illustrates the dependency of this error characteristic on both lead screw 250 pitch and on the number of channels used. The principle elucidated here is that multiples of the base case (of FIG. 6*a*) that are powers of 2 provide consistent, predictable results and guide in the selection of the optimal pitch for lead screw 250. As the above discussion shows, one step per channel is optimal, but a 4 mm pitch for lead screw 250 is impractical. Moving to an 8 mm lead screw 250 requires a half step per channel. However, writing an odd number of channels using an 8 mm lead screw 250 then causes adjacent writing swaths 450 to be 180 degrees out of phase.

Figure 7C:
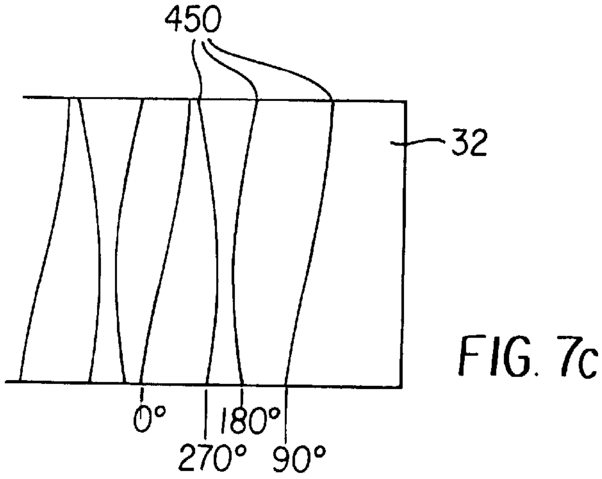
Figure 7D:
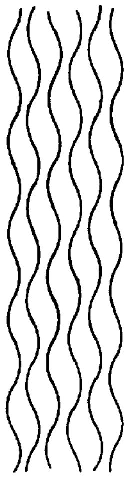

There are a number of important considerations:

(1) The degree to which an out-of-phase condition of adjacent writing swaths 450 is a problem is not the same for every application. In fact, it may not be visibly objectionable if adjacent writing swaths 450 are out of phase in even multiples of 90 degrees, as is represented in FIG. 7*c*. (This is, in part, dependent on the magnitude of the error. Also, see note 4 below for error frequency considerations.) FIG. 7*d* illustrates this pattern of adjacent swaths, each swath 90 degrees shifted from its adjacent swaths, over a small portion of the written image.

(2) Adjacent writing swaths 450 need not start where positional error 154 is zero, as is indicated in FIGS. 6*a* and 7*a*. The requirement is that the phases be in the same relationship, wherever adjacent phases begin when considering the positional error 154 characteristic.

Figure 7E:
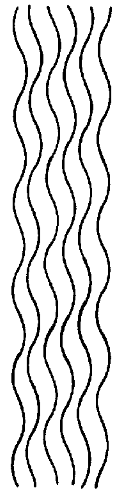

(3) Phase relationships are most likely to cause problems where adjacent writing swaths 450 are out of phase by some value other than an exact integral multiple of 90 degrees. For example, adjacent writing swaths 450 each out of phase with the preceding writing swath 450 by 34.7 degrees will likely cause objectionable diagonal streaks in the image output. FIG. 7*e* illustrates a pattern of adjacent swaths with each swath shifted approximately 60 degrees from its adjacent swath.

Figure 10:
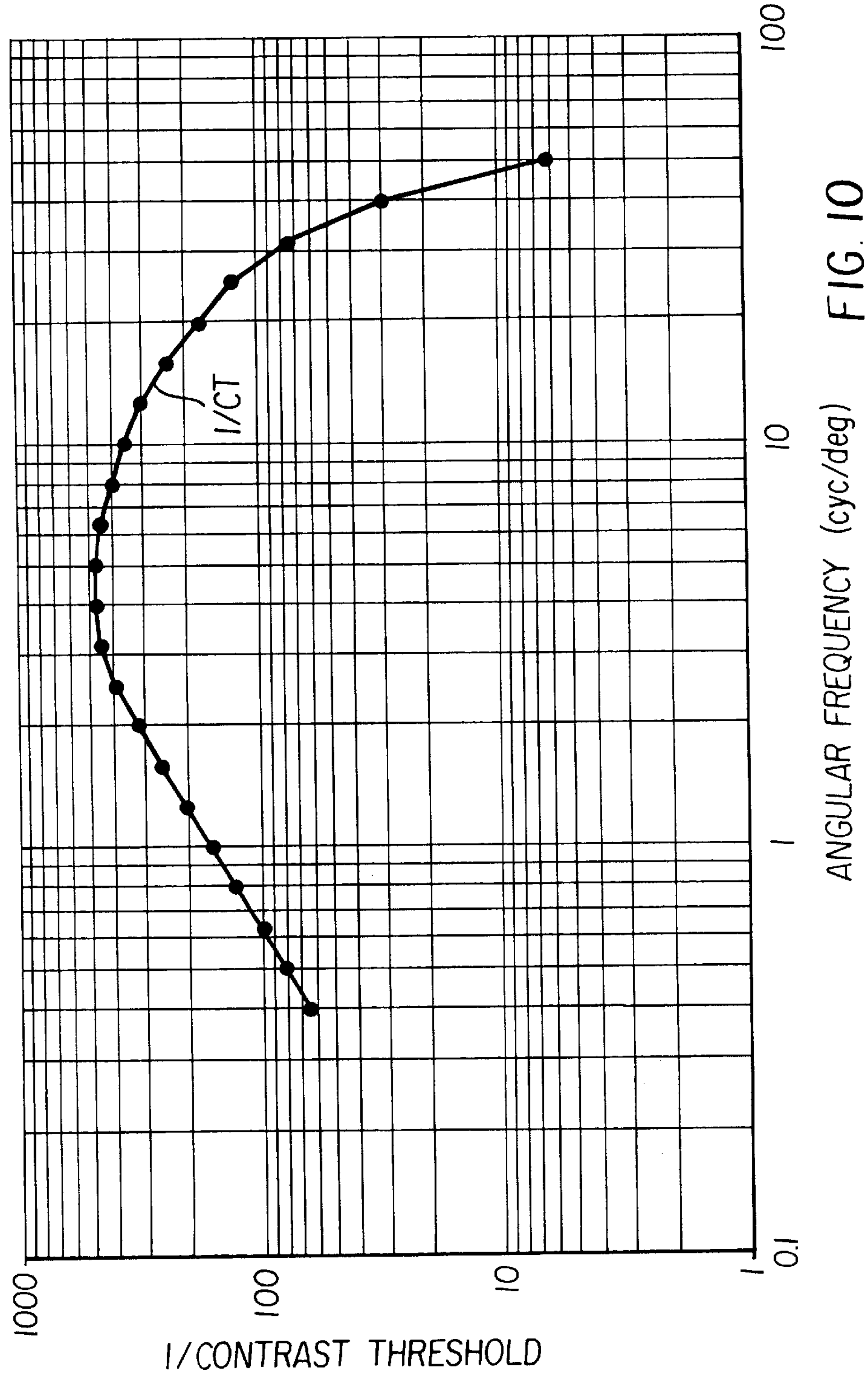
FIG. 10 shows a graph of the reciprocal visual contrast threshold versus angular frequency.

(4) The swath-to-swath error at the intended resolutions for the embodiment of this invention (that is, using 28 channels per swath at 2540 or 2400 dpi) falls within the region at which the human eye is most sensitive to periodic changes in contrast. Research by Van Nes and Bouman ("Spatial Modulation Transfer in the Human Eye", *Journal of the Optical Society of America*, Vol. 57 No. 3, March 1967, Floris L. Van Nes and Maarten A. Bouman) and by Campbell and Robson ("Application of Fourier analysis to the visibility of gratings", *Journal of Physiology* (London) 197:pp. 551–566) shows that human eye sensitivity to low-contrast patterns varies with the frequency at which the contrast changes. The graph of FIG. 10 plots the log of the inverse of a perceptible contrast threshold against the log of the angular frequency, in cycles per degree. (This graph uses the same data provided by Van Nes and Bouman, presented in an alternate graphical manner to show how human eye sensitivity peaks over a specific range of frequencies.) Referring to FIG. 10, note, for example, that contrast sensitivity peaks at around 5 cycles per degree, with significant sensitivity in the range from 1 to 20 cycles per degree. Sensitivity to frequency changes then decreases for frequencies below 1 cycle/degree, and, at the high end, decreases significantly for frequencies above 20 cycles/degree.

Figure 11:
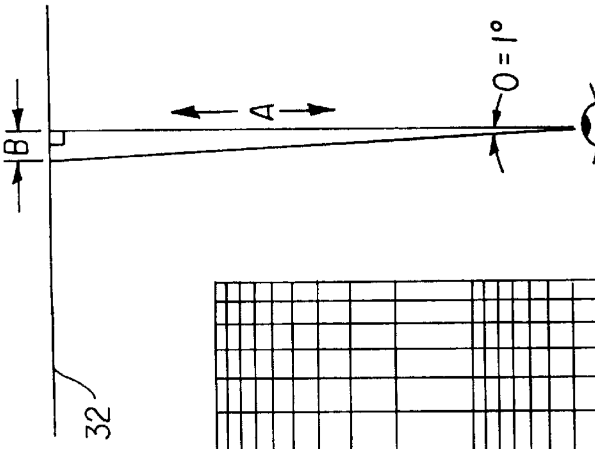
FIG. 11 shows how the dimensions of the printed receiver relate to a one-degree viewing angle, as used to determine whether or not contrast frequency is perceptible to the human eye.

For the perceptual data graphed in FIG. 10, the area on the imaged receiver that corresponds to one degree depends on the viewer's distance from the imaged receiver. A 1-degree viewing angle, with the viewer's eye 10 inches from the imaged receiver surface, translates to approximately 0.175 in. on the surface of the imaged receiver. As FIG. 11 shows, this relationship is simply a tangent function. An angle of 1 degree has a tangent of approximately 0.0175. As FIG. 11 shows, the tangent of the viewing angle is the ratio of distances A/B. Where the viewing distance, A, is 10 inches, distance B (which would represent the distance on the imaged receiver) is then 0.175 inches.

According to the Van Nes and Bouman data cited above, the viewer's eye is most sensitive to frequency changes over a range from 1 cycle/degree to about 20 cycles/degree. The problem encountered with the preferred embodiment of this invention is that swath-to-swath irregularities can cause low frequency, high-contrast image artifacts within this peak sensitivity range. To illustrate this, consider a typical swath width for the preferred embodiment of this invention. At 2540 dpi, imaged dots are 10 microns apart. A swath using 28 channels would then have a swath width of 280 microns, or 0.028 cm. At a view distance of 10 inches, this gives the following:

$$\frac{1\text{ cycle}}{0.028\text{ cm}}\cdot\frac{2.54\text{ cm}}{\text{in}}\cdot\frac{0.175\text{ in}}{\text{degree}}\cong 15.9\text{ cycles/degree}$$

As the graph of FIG. 10 shows, the eye is very sensitive to low-contrast changes that occur at this frequency. (This is particularly true in areas of the image which are nominally of uniform tone.) Note also that printing proofs are often viewed at a closer distance than 10 inches, which moves the cycles/degree value even closer to the peak sensitivity range. For a view distance of 6 inches, for example, an image written using the same 28-channel swath would have a contrast frequency at approximately 9.5 cycles/degree. Because swath widths for the imaging subsystem in the preferred embodiment of this invention repeat within this contrast sensitivity range, it is especially important that swath-to-swath regularity be minimized. Otherwise, even slight swath-to-swath irregularities can be perceived due to the above-described contrast sensitivity effects.

For selection of a lead screw 250 pitch, this invention uses multiples of the base lead screw 250 pitch computed in equation (1) above. One specific implementation of this invention, for imaging at 2,540 dots per inch, uses a lead screw 250 pitch of 16 mm. This means that stepper motor 162 advances ¼ full steps 168 per pixel. The chart that follows shows the phase relationship of adjacent writing swaths 450 for this implementation, when using different writing th 450 widths.

Chart for Swath-to-Swath Phase Difference, 16 mm Lead Screw 250 Pitch

| # channels | Degrees out of phase, swath-to-swath |
|---|---|
| 1 | 90 |
| 2 | 180 |
| 3 | 270 |
| 4 | 0 |
| 5 | 90 |
| 6 | 180 |
| 7 | 270 |
| 8 | 0 |
| 9 | 90 |
| 10 | 180 |
| 11 | 270 |
| 12 | 0 |
| 13 | 90 |
| 14 | 180 |
| 15 | 270 |
| 16 | 0 |
| 17 | 90 |
| 18 | 180 |
| 19 | 270 |
| 20 | 0 |
| 21 | 90 |
| 22 | 180 |
| 23 | 270 |
| 24 | 0 |
| 25 | 90 |
| 26 | 180 |
| 27 | 270 |
| 28 | 0 |

Figure 8:
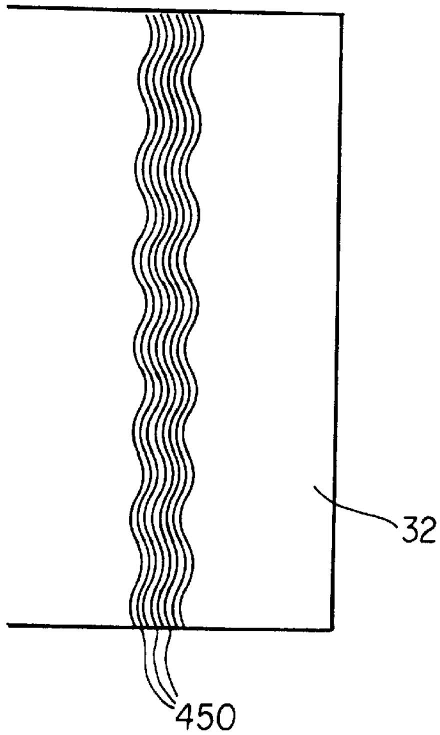
FIG. 8 shows the swath pattern used in a preferred embodiment for this invention.

In the preferred embodiment of this invention, then, the best choice for number of channels is to use a multiple of 4. The preferred embodiment of this invention uses 28 channels, at 2,540 dpi, with 7 full steps 168 per writing swath 450. This results in the output writing swath 450 having the positional error 154 characteristic represented in FIG. 8. As FIG. 8 shows, and as listed in the above chart, adjacent swaths are in phase (at 2,540 dpi) when using 28 channels with a lead screw having 16 mm thread pitch.

The invention has been described with reference to the preferred embodiment thereof. However, it will be appreciated and understood that variations and modifications can be effected within the spirit and scope of the invention as described herein above, and as defined in the appended claims, by a person of ordinary skill in the art without departing from the scope of the invention. For example, the invention is applicable to any imaging application wherein a printhead 500 or a scanning device of some other type is driven by a motor that runs in microstepping mode. This invention could be applied to an apparatus that uses a vacuum imaging drum 300 or to some other type of imaging apparatus that uses, for example, a platen or flat-bed scanner. The method disclosed in this invention could be modified for use with a stepper motor 162 having any number of full steps 168 per revolution and can be adapted for any of a number of imaging resolutions.

The invention has been described in detail with particular reference to certain preferred embodiments thereof, but it will be understood that variations and modifications can be effected within the spirit and scope of the invention.

| PARTS LIST | |
|---|---|
| 10. | Image processing apparatus |
| 12. | Image processor housing |
| 14. | Image processor door |
| 16. | Donor ejection chute |
| 18. | Donor waste bin |
| 20. | Media stop |
| . | |
| . | |
| . | |
| 30. | Roll media |
| 32. | Thermal print media |
| 34. | Dye donor roll material |
| 36. | Dye donor sheet material |
| . | |
| . | |
| . | |
| 50a. | Lower sheet material tray |
| 50b. | Upper sheet material tray |
| 52a. | Lower media lift cam |
| 52b. | Upper media lift cam |
| 54a. | Lower media roller |
| 54b. | Upper media roller |
| 56. | Media guide |
| 58. | Media guide rollers |
| 60. | Media staging tray |
| . | |
| . | |
| . | |
| 80. | Transport mechanism |
| . | |
| . | |
| . | |
| 100. | Media carousel |
| . | |
| . | |
| . | |
| 110. | Media drive mechanism |
| 112. | Media drive rollers |
| . | |
| . | |
| . | |
| 120. | Media knife assembly |
| 122. | Media knife blades |
| . | |
| . | |
| . | |
| 150. | Phase A |
| 152. | Phase B |
| 154. | Positional error |
| 156. | Reduced positional error |

-continued

| PARTS LIST | |
|---|---|
| 158. | Corrected waveform |
| 160. | Discrete steps |
| 162. | Stepper motor |
| 164. | Error profile |
| 166. | Stepper motor controller |
| 168. | Full steps |
| 170. | Index pulse |
| 172. | Microstep |
| 174. | Corrected waveform |
| . | |
| . | |
| . | |
| 180. | Dye binding assembly |
| 182. | Media entrance door |
| 184. | Media exit door |
| . | |
| . | |
| . | |
| 200. | Lathe bed scanning subsystem |
| 202. | Lathe bed scanning frame |
| 204. | Entrance passageway |
| 206. | Rear translation bearing rod |
| 208. | Front translation bearing rod |
| 220. | Translation stage member |
| . | |
| . | |
| . | |
| 250. | Lead screw |
| 252. | Threaded shaft |
| 254. | Lead screw drive nut |
| 258. | Linear drive motor |
| 260a. | Axial load magnet |
| 260b. | Axial load magnet |
| 262. | Circular-shaped boss |
| 264. | Ball bearing |
| 266. | Circular-shaped insert |
| 268. | End cap |
| 270. | Hollowed-out center portion |
| 272. | Radial bearing |
| . | |
| . | |
| . | |
| 300. | Vacuum imaging drum |
| 301. | Axis of rotation |
| . | |
| . | |
| . | |
| 344. | Drum encoder |
| . | |
| . | |
| . | |
| 400. | Laser assembly |
| 402. | Lasers diode |
| 404. | Fiber optic cables |
| 406. | Distribution block |
| . | |
| . | |
| . | |
| 450. | Writing swath |
| . | |
| . | |
| . | |
| 456. | Printhead position (Start) |
| 458. | Printhead position (End) |
| . | |
| . | |
| . | |
| 500. | Printhead |
| 1000. | Axis of Rotation |
| 2000. | Dead Band |

What is claimed is:

1. A method of selecting a lead screw pitch for an image processing apparatus comprising the steps of:

selecting a desired resolution in pixels per mm;

choosing an optimal number of pixels per motor step;

selecting a stepper motor having a predetermined number of motor steps per revolution; and calculating said lead screw pitch by multiplying an inverse of said desired resolution by said optimal number of pixels per motor step by said predetermined number of motor steps per revolution.

2. A method according to claim 1, comprising the further step of:

determining a periodic positional error of said stepper motor under load; and selecting a number of channels which provides an in-phase periodic positional error swath-to-swath.

3. A method according to claim 1, comprising the further step of selecting a multiple of said calculated lead screw pitch, wherein said multiple is a power of 2 and manufacturing a lead screw having a pitch which is said multiple of said calculated lead screw pitch.

4. A method according to claim 1, comprising the further step of selecting said number of pixels per motor step based on an optimal motor speed.

5. A method according to claim 1, wherein said stepper motor is operated in a microstepping mode.

* * * * *